United States Patent
Fleischer, III et al.

(10) Patent No.: US 7,274,786 B2
(45) Date of Patent: *Sep. 25, 2007

(54) METHOD AND SYSTEM FOR PROCESSING TELEPHONE CALLS VIA A REMOTE TIE-LINE

(75) Inventors: Harold C. Fleischer, III, San Antonio, TX (US); John E. Simino, Arnold, MI (US); Kenneth Robert Stroud, Lago Vista, TX (US)

(73) Assignee: AT&T Labs, Inc., Austin, TX (US)

( * ) Notice: Subject to any disclaimer, the term of this patent is extended or adjusted under 35 U.S.C. 154(b) by 987 days.

This patent is subject to a terminal disclaimer.

(21) Appl. No.: 10/393,938

(22) Filed: Mar. 24, 2003

(65) Prior Publication Data
US 2003/0235284 A1 Dec. 25, 2003

Related U.S. Application Data

(63) Continuation of application No. 09/760,835, filed on Jan. 17, 2001, now Pat. No. 6,567,514.

(51) Int. Cl.
*H04M 7/00* (2006.01)
(52) U.S. Cl. .......................... 379/221.03; 379/221.08; 379/224; 379/225; 379/232; 379/234; 379/901
(58) Field of Classification Search .............. 379/219, 379/220.01, 221.01, 221.02, 221.03, 221.08, 379/221.09, 221.12, 221.14, 224, 225, 230, 379/231, 232, 234, 901
See application file for complete search history.

(56) References Cited

U.S. PATENT DOCUMENTS

| | | | |
|---|---|---|---|
| 4,191,860 | A | 3/1980 | Weber |
| 4,266,098 | A | 5/1981 | Novak |
| 4,348,554 | A | 9/1982 | Asmuth et al. |
| 4,577,066 | A | 3/1986 | Bimonte et al. |
| 4,594,477 | A | 6/1986 | Noirot |

(Continued)

FOREIGN PATENT DOCUMENTS

| | | |
|---|---|---|
| CL | 647-97 | 4/1997 |

(Continued)

OTHER PUBLICATIONS

Berman, Roger K., and Brewster, John H., "Perspectives on the AIN Architecture," IEEE Communications Magazine, Feb. 1992, pp. 27-32.

(Continued)

*Primary Examiner*—Harry S. Hong
(74) *Attorney, Agent, or Firm*—Greenblum & Bernstein, P.L.C.

(57) ABSTRACT

A method and system include routing telephone calls from multiple private networks via public lines and trunks in a public switched telephone network (PSTN) to a host switch, at which the connections would begin to run parallel. The host switch routes the telephone calls via a private trunk group to a private facility, such as an electronic tandem network (ETN) node or an asynchronous transfer mode (ATM) switch. If the private trunk group is full or unavailable, the host switch routes the telephone calls over alternate private or public trunk groups and selected carriers.

23 Claims, 13 Drawing Sheets

U.S. PATENT DOCUMENTS

| | | | |
|---|---|---|---|
| 4,611,094 A | 9/1986 | Asmuth et al. | |
| 4,611,096 A | 9/1986 | Asmuth et al. | |
| 4,757,267 A | 7/1988 | Riskin | |
| 4,788,718 A | 11/1988 | McNabb | |
| 4,802,199 A | 1/1989 | Lange et al. | |
| 4,811,334 A | 3/1989 | Matt | |
| 5,029,196 A | 7/1991 | Morganstein | |
| 5,206,899 A | 4/1993 | Gupta et al. | |
| 5,247,571 A | 9/1993 | Kay et al. | |
| 5,274,698 A | 12/1993 | Jang | |
| 5,333,183 A | 7/1994 | Herbert | |
| 5,339,356 A * | 8/1994 | Ishii | 379/234 |
| 5,353,331 A | 10/1994 | Emery et al. | |
| 5,388,150 A | 2/1995 | Schneyer et al. | |
| 5,422,941 A | 6/1995 | Hasenauer et al. | |
| 5,425,087 A | 6/1995 | Gerber et al. | |
| 5,436,957 A | 7/1995 | McConnell | |
| 5,467,388 A | 11/1995 | Redd et al. | |
| 5,490,212 A | 2/1996 | Lautenschlager | |
| 5,517,562 A | 5/1996 | McConnell | |
| 5,539,817 A * | 7/1996 | Wilkes | 379/230 |
| 5,550,904 A | 8/1996 | Andruska et al. | |
| 5,563,933 A | 10/1996 | August et al. | |
| 5,574,780 A | 11/1996 | Andruska et al. | |
| 5,574,781 A | 11/1996 | Blaze | |
| 5,592,530 A | 1/1997 | Brockman et al. | |
| 5,592,541 A | 1/1997 | Fleischer, III et al. | |
| 5,659,605 A | 8/1997 | Voit et al. | |
| 5,673,312 A | 9/1997 | Andruska et al. | |
| 5,680,446 A | 10/1997 | Fleischer, III et al. | |
| 5,734,705 A | 3/1998 | Schlossman et al. | |
| 5,751,800 A | 5/1998 | Ardon | |
| 5,793,853 A | 8/1998 | Sbisa | |
| 5,799,073 A | 8/1998 | Fleischer, III et al. | |
| 5,825,868 A * | 10/1998 | Diamond | 379/243 |
| 5,862,203 A | 1/1999 | Wulkan et al. | |
| 5,878,127 A | 3/1999 | Fleischer, III et al. | |
| 5,892,821 A | 4/1999 | Turner | |
| 5,917,899 A | 6/1999 | Moss et al. | |
| 5,920,619 A | 7/1999 | Karppinen | |
| 5,940,485 A | 8/1999 | Sapra et al. | |
| 5,940,487 A | 8/1999 | Bunch et al. | |
| 5,974,133 A | 10/1999 | Fleischer, III et al. | |
| 5,987,107 A | 11/1999 | Brown | |
| 5,995,605 A | 11/1999 | Madoch et al. | |
| 6,125,354 A | 9/2000 | MacEarlane et al. | |
| 6,137,869 A | 10/2000 | Voit et al. | |
| 6,141,409 A | 10/2000 | Madoch et al. | |
| 6,222,912 B1 | 4/2001 | Breuer | |
| 6,282,267 B1 | 8/2001 | Nolting | |
| 6,400,818 B1 | 6/2002 | Madoch et al. | |
| 6,453,035 B1 | 9/2002 | Psarras et al. | |
| 6,480,595 B1 | 11/2002 | Hamano | |
| 6,490,345 B2 | 12/2002 | Fleischer, III et al. | |
| 6,567,514 B2 * | 5/2003 | Fleischer et al. | 379/221.03 |
| 6,697,814 B1 | 2/2004 | Porter | |
| 2002/0090074 A1 | 7/2002 | Sbisa et al. | |
| 2002/0094070 A1 | 7/2002 | Mott et al. | |

FOREIGN PATENT DOCUMENTS

| | | |
|---|---|---|
| WO | 98/15102 | 4/1998 |
| WO | 02/058399 | 7/2002 |
| ZA | 97/7551 | 8/1997 |

OTHER PUBLICATIONS

Generic Requirements for GetData (Bellcore GR-2838-CORE), Issue 1, Aug. 1994.

Generic Requirements for GetData (Bellcore GR-2838-CORE), Revision 1, Jul. 1996.

"ISDN Call Forwarding," Bell Communications Research, Technical Reference TR-TSY-000853, Issue 1 (Dec. 1988).

"ISDN Call Forwarding, Revision 1," Bell Communications Research, Technical Reference TR-TSY-000853, Revision 1 (Dec. 1993).

"CLASS Feature: Calling Number Delivery," Bell Communications Research, Technical Reference TR-TSY-000031, Issue 3 (Jan. 1990).

"CLASS Calling Name Delivery Generic Requirements", Bell Communications Research, Technical Reference TR-NWT-001188, Issue 1 (Dec. 1991).

"Status of PINs and Remote Access", Bell Communications Research, Technical Memorandum TM-INS-021336 (May 1992).

"Advanced Intelligent Network Release 0.1 Switching System Generic Requirements", Bell Communications Research, Technical Reference TR-NWT-001284, Issue 1 (Aug. 1992).

"Advanced Intelligent Network Release 0.1 Switch-Service Control Point Application Protocol Interface Generic Requirements", Technical Reference TR-NWT-001285, Issue 1 (Aug. 1992).

English Language Abstract of CL 647-97.

* cited by examiner

| | |
|---|---|
| (ETN Node) | ETN Node |
| (ATM) | Asynchronous Transfer Mode Switch |
| (C) | CENTREX |
| (P) | PBX |
| (RTL) | ASF-RTL TN |
| [IG] | International Gateway |
| (M) | IXC POP |
| —— | Private Trunk Group |

METHOD AND SYSTEM FOR PROCESSING TELEPHONE CALLS VIA A REMOTE TIE-LINE

CROSS-REFERENCE TO RELATED APPLICATIONS

This application is a continuation of U.S. patent application Ser. No. 09/760,835, filed Jan. 17, 2001 now U.S. Pat. No. 6,567,514, which is hereby incorporated by reference in its entirety. This application is also related to the following applications: U.S. patent application Ser. No. 09/760,728, filed Jan. 17, 2001, U.S. patent application Ser. No. 09/760,832, filed Jan. 17, 2001, U.S. patent application Ser. No. 09/760,834, filed Jan. 17, 2001 and U.S. patent application Ser. No. 09/760,833, filed Jan. 17, 2001, which are also hereby incorporated by reference in their entireties.

BACKGROUND OF THE INVENTION

1. Field of the Invention

The present invention relates to the field of telecommunications. More particularly, the present invention relates to area wide central exchange service (centrex) and private branch exchange (PBX) systems.

2. Acronyms

The written description provided herein contains acronyms that refer to various telecommunications services, components and techniques, as well as features relating to the present invention. Although some of these acronyms are known, use of these acronyms is not strictly standardized in the art. For purposes of the written description herein, the acronyms are defined as follows:

Access Code (AC)
Advanced Intelligent Network (AIN)
American Standard Code for Information Interchange (ASCII)
Automatic Selection of Facilities-Remote Tie Line (ASF-RTL)
Asynchronous Transfer Mode (ATM)
Called Party Number (CDN)
Calling Party Number (CPN)
Call Type Code (CTC)
Carrier Identification Code (CIC)
Central Exchange Service (Centrex)
Centralized Route Selection (CRS)
CentrexSMART Front End (CFE)
Custom Virtual Network (CVN)
Customized Dialing Plan-Access Code (CDP-AC)
Direct Inward Dial (DID)
Electronic Tandem Network (ETN)
File Transfer Protocol (FTP)
Initial Address Message (IAM)
Integrated Service Control Point (ISCP)
Interexchange Carrier (IXC)
Local Access and Transport Area (LATA)
Local Exchange Carrier (LEC)
Lucent Service Control Point (LSCP)
Manipulation Dialing Plan (MDP)
Multi-Frequency (MF)
Numbering Plan Area (NPA) a.k.a. area code
North American Numbering Plan (NANP)
Nature Of Number (NON)
Off Hook Delay (OHD)
Original Called Number (OCN),
Outgoing Call Screening (OCS)
Point of Presence (POP)
Private Network (PN)
Privilege Class (PC)
Private Branch Exchange (PBX)
Private Numbering Plan (RXX)
Public Office Dial Plan (PODP)
Public Switched Telephone Network (PSTN)
Redirected Number (RDN)
Regional Bell Operating Company (RBOC)
Remote Tie Line Billing Reduction (RBR)
Service Control Point (SCP)
Service Switching Point (SSP)
Signaling System 7 (SS7)
Signaling Transfer Point (STP)
Station Message Detail Recording (SMDR)
Special Dialing Plan (SDP)
Terminating Attempt Trigger (TAT)
Transaction Capabilities Application Part (TCAP)
Transmission Control Protocol/Internet Protocol (TCP/IP)
Trunk Group (TG)
Usage Billing Reduction (UBR)
Usage Billing Suppression (UBS)
Virtual Private Network (VPN)

3. Background Information

Currently, enterprises are removing private electronic tandem networks (ETNs), which are dependent on a network of private lines, in order to reduce network expenses. With the reduction in prices on public switched telephone network (PSTN) usage and the increase in price of private lines, it is desirable for enterprises to direct their call traffic over the PSTN using a local Regional Bell Operating Company (RBOC) virtual network, if available. Increased use of the PSTN also reduces responsibility for telecommunications maintenance functions within the enterprises' domain, which are inherent with any system dependent on private facilities, such as ETN and asynchronous transfer mode (ATM) facilities. Although many enterprises are comfortable sending as much traffic as possible over the PSTN, they may desire to retain portions of their private facilities, such as ATM backbones and international links, as needed, thus creating the need for a hybrid virtual private network-private network (VPN-PN).

The virtual network market is growing rapidly. Virtual network offerings by the interexchange carriers (IXCs) such as AT&T's Software Defined Network (SDN), MCI's Virtual Networking Service (VNET), and Sprint's Virtual Private Network (VPN) are the primary market players in virtual network services.

AT&T markets SDN primarily to large users and has been one of the most popular services offered by resellers and aggregators. AT&T also offers Software Defined Data Network (SDDN) as an optional feature. SDDN provides data networking capability for its SDN service. SDN provides users with on-line network management capabilities to proactively monitor and control performance, security, accounting, network planning and configuration which is a major strength. AT&T has improved its billing features by introducing OneNet, a new SDN billing service. OneNet combines the charges from a customer's SDN and 800 services onto one bill. OneNet does not, however, provide a predictable monthly bill.

MCI's VNET provides customers with long distance, voice, data and messaging services, both on domestic and international levels. VNET supports voice and data transmission up to 64 Kbps. VNET also provides optional features such as an integrated network management service. A major strength of VNET is the centralized software defined database, which can be controlled directly from a workstation on the customer's premises. MCI also offers MCI Perspective, which is a PC based software analysis tool allowing customers to track, analyze and control their telecommunications billing information. MCI Perspective does not, however, provide a predictable monthly bill.

Sprint's VPN is a voice and data network operated by a single software controlled management system through the use of shared transmission facilities. VPN supports 56 Kbps transmission and was designed for large corporate telecommunications users with multiple locations. Sprint's Insight Executive integrates the network management of VPN with other Sprint services such as 800, WATS, etc. onto a single platform. Another strength is Sprint's Insite ACT, a phone-based service change tool that allows VPN customers to add, change or cancel their VPN service.

In FLEISCHER, III et al., U.S. Pat. No. 5,974,133, the disclosure of which is expressly incorporated herein by reference in its entirety, an overlay method and system are described for a multiple location communications network, which provide additional telecommunication services, such as abbreviated dialing plans, automatic selection of routing, centralized access to private and public network facilities, and outgoing call screening. FLEISCHER, III et al.'s system is a good basic system, but provides limited flexibility and offers limited options for automatic selection of routing, centralized access to private network facilities and outgoing call screening. FLEISCHER, III et al's system also does not provide predictable periodic billing or centralized data collection.

Routing traffic to hub switches is well known in the field of telecommunications. For example, MOSS et al., U.S. Pat. No. 5,917,899, the disclosure of which is expressly incorporated herein by reference in its entirety, teach a method for providing an interLATA virtual private network, using host or "hub" switches in the PSTN to connect calls within the network. An interLATA, intra-network call is routed, based on instructions from an SCP, from an originating switch to a first hub switch within the same LATA as the originating switch and then to a second hub switch within the same LATA as the called party number. MOSS et al.'s system is limited, though, to accommodating abbreviated dialing for in-network calls across more than one LATA. Also, MADOCH et al., U.S. Pat. No. 5,995,605, the disclosure of which is expressly incorporated herein by reference in its entirety, teach a hub switch that combines calls from multiple switches to a centrex telephone line into a data stream. The data stream is transmitted over a digital trunk to an information network node servicing a high traffic computer network, such as an Internet access system. MADOCH et al.'s system is limited to routing calls to an information network having a predetermined access number and does not handle routine customer telephone traffic.

The overarching need is to have a comprehensive network alternative to private facilities, such as ETN, including centralized administration of carrier and private route selections as well as centralized call screening functions. Moreover, the "virtual network" should be a uniform application. Currently, the virtual network systems do not provide the needed flexibility for efficiently merging a PSTN system and a private network to maximize call flow efficiency and cost control.

Rather, the systems either restrict calls to the PSTN or to private networks with little flexibility, or the systems route calls over a combination of the PSTN and private networks, based on a real time analysis of trunk and carrier availability, often resulting in duplication of effort or overuse of one of the sets of resources. For example, small remote locations within a private network tend to funnel calls, as a practical matter, through the same ETN node. Use of only private trunk groups in this situation is overly expensive because the call traffic from individual locations is insufficient to warrant the expense of the private lines. Use of only the PSTN therefore appears to be more appropriate. However, at some point, the aggregated calls from several remote locations begin to parallel one another to access the single ETN node, thus overusing the PSTN and causing excessive expense to the customer. A private trunk group dedicated to the ETN node in this situation would handle the call traffic less expensively.

Conventional systems also offer limited reporting functions. For example, current systems produce call data records, referred to as station message detail recording (SMDR), which is used by customers to determine outgoing call activity on a station by station basis. SMDR call details are accessible through an optional SMDR port on a PBX where the call originates, or in the case of centrex, through the serving network central office switch where the call originates. With centrex, SMDR records flow to an SMDR host central processing unit in preparation for SMDR delivery to the customer. The centrex SMDR network is known as centrex station message detail recording and transmission (CentrexSMART). The current centrex and PBX SMDR systems, however, are independent of one another so it is not possible for the customer with both PBX and centrex SMDR records to have the data streams combined and delivered to the customer as one aggregated data stream direct from the serving PBX or network switch.

Furthermore, the collection and dissemination of the SMDR data is currently very decentralized. The SMDR data on which the calling records are based are collected at local service switching points. Therefore, each PBX providing SMDR data requires a specific connection to its SMDR port, and in the case of centrex, each network switch must have direct connectivity to the SMDR host (i.e., CentrexSMART) for the data to be transferred. Also, each switch/PBX must be loaded with a relatively expensive SMDR package, for instructions regarding records to capture and transmit. For example, if the customer's network is serviced by five service switching points, the customer or local exchange carrier must have five SMDR packages loaded at all five locations.

BRIEF DESCRIPTION OF THE DRAWINGS

The present invention is further described in the detailed description that follows, by reference to the noted plurality of drawings by way of non-limiting examples of embodiments of the present invention, in which like reference numerals represent similar parts throughout several views of the drawings, and in which.

DETAILED DESCRIPTION OF EMBODIMENTS

Figure 1:
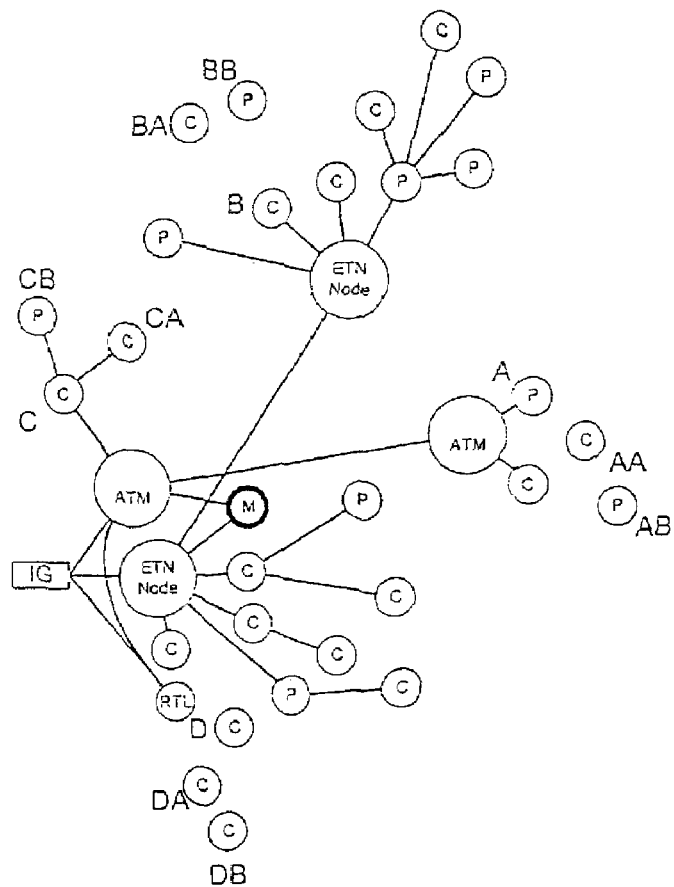
FIG. 1 is a block diagram showing an exemplary telecommunications network, according to an aspect of the present invention.

In view of the above, the present invention through one or more of its various aspects and/or embodiments is presented to accomplish one or more objectives and advantages, such as those noted below.

An aspect of the present invention provides a method for efficiently routing a call from a private telecommunications network through a public switched telephone network (PSTN) and multiple trunk groups, including at least one private trunk group. The private telecommunications network may include both central exchange service (centrex) and private branch exchange (PBX) systems. The method includes setting a called party ID to correspond to an automatic selection of facilities-remote tie-line (ASF-RTL) telephone number and routing the call through a public trunk group from a first switch to a switch hosting the ASF-RTL telephone number. The call is then routed through a private trunk group from the switch hosting the ASF-RTL telephone number to a private customer facility hosting the called party number. The method may include initially determining whether the call is subject to ASF-RTL processing.

In an embodiment of the invention, the method further includes routing the call from the switch hosting the ASF-RTL telephone number to the private customer facility hosting the called party number through an alternative trunk group whenever the private trunk group is full or unavailable. Furthermore, whenever a service control point (SCP) determines that a called party number of the call is an international number, the call is routed from the private customer facility to an international gateway.

Another aspect of the present invention provides a method for efficiently routing a call to a called party number from a private telecommunications network, which includes at least one centrex or PBX, through a PSTN and multiple trunk groups. The call routing method includes querying an SCP for call processing instructions for the call and identifying whether the call is subject to ASF-RTL processing. The query includes a calling party ID corresponding to a calling party number and a called party ID corresponding to the called party number. When the call is subject to ASF-RTL processing, the called party ID is set to correspond to an ASF-RTL telephone number and an original called party ID is set to correspond to the called party number. Call processing instructions are then transmitted from the SCP to an originating service switching point. The call processing instructions include the calling party ID, the called party ID and the original called party ID. The call is routed to a host service switching point that corresponds to the called party ID.

The SCP is queried for additional call processing instructions. The query includes the calling party ID, the called party ID and the original called party ID. Additional call processing instructions are determined, which include at least one private trunk group through which to route the call. The called party ID is reset to correspond to the original called party ID. The additional call processing instructions are transmitted from the SCP to the host service switching point and the call is routed from the host service switching point to a private switching facility of the customer through the private trunk group. The private switching facility may include electronic tandem network nodes and asynchronous transfer mode switches. The method may also include routing the call to a destination service switching point and connecting the calling party number with the called party number.

In another aspect of the invention, the additional call processing instructions are determined by first determining at least one alternative trunk group and at least one carrier by which to route the call. Routing the call from the host service switching point then includes determining whether the private trunk group is full or unavailable and, whenever the private trunk group is full or unavailable, routing the call to the private switching facility by an alternative trunk group. When the alternative trunk group is a public trunk group, the routing also includes a carrier.

In an embodiment of the invention, determining whether the telephone call from the calling party number to the called party number is subject to ASF-RTL is based on the type of call. Other embodiments determine whether the telephone call from the calling party number to the called party number is subject to ASF-RTL processing based on the date, the day of week, the time of day or a percentage allocation.

Another aspect of the present invention provides a system for efficiently routing a call from a private telecommunications network through a PSTN and a plurality of trunk groups, including at least one private trunk group associated with an ASF-RTL telephone number. The private telecommunications network includes a centrex, a PBX, or both. The system includes an SCP, which processes telephone calls, and multiple service switching points. A first service switching point queries the SCP in response to the call from the private telecommunications network. A second service switching point includes a host switching point for the private trunk associated with the ASF-RTL telephone number and a third service switching point includes a private facility of the customer. The SCP determines from the query whether the call is subject to routing through the second switching point. If so, the SCP instructs the first service switching point to route the call to the second service switching point. The second service switching point then routes the call to the third service switching point through the private trunk group associated with the ASF-RTL telephone number.

In another aspect of the invention, the system also includes an international gateway. When the SCP determines that the called party number is an international telephone number, the call is routed from the third service switching point to the international gateway. Likewise, the system may include an interexchange carrier. When the SCP determines that the called party number is a long distance telephone number, the call is routed from the third service switching point to the interexchange carrier.

Another aspect of the present invention provides a system for efficiently routing a call from a private telecommunications network of a customer, including a centrex or a PBX, through a PSTN and multiple trunk groups, including at least one private trunk group. The system includes an SCP, which processes telephone calls and has an ASF-RTL routing database. The system also includes an originating service switching point, which launches a trigger to the SCP in response to a call initiated at a telephone in the customer's private telecommunications network, and a host switching facility, which hosts an ASF-RTL telephone number associated with the private trunk group. The host switching facility receives the call from the originating service switching point based on instructions from the SCP. The system also includes a private switching facility that hosts at least one second private telecommunications network and connects to the host switching facility by the private trunk group. The private switching facility, which can include electronic tandem network nodes and asynchronous transfer mode switches, receives the call from the host switching facility based on routing instructions from the SCP. The system may also include a terminating service switching point to which the call is directed from the private switching facility. The terminating service switching point is instructed by the SCP to terminate the call at the called party number.

The SCP receives a calling party ID and a called party ID corresponding to the call from the originating service switching point and determines from the ASF-RTL routing database whether the call is subject to ASF-RTL routing. If the call is subject to ASF-RTL routing, the SCP sets the called party ID to be the ASF-RTL telephone number associated with the private trunk group, so that the originating service switching point forwards the call to the host switching facility. The routing instructions include instructions on transmitting the call from the host switching facility to the private switching facility by the private trunk group.

In alternative embodiments of the invention, the ASF-RTL routing database includes routing information based on any combination of the type of call, the date, the day of week, the time of day and a percentage allocation. The routing instructions may also include the multiple trunk groups, which, in addition to the private trunk group, include alternative trunk groups and carriers. When the private trunk group is not available or full, the host switching facility selects one of the alternative trunk groups and, if the selected alternative trunk group is a public trunk group, one of the carriers by which to forward the call to the private switching facility. Each of the multiple trunk groups includes multi-frequency trunks.

This present invention upgrades the current Custom Virtual Network (CVN) application, increasing functionality of the application. At this time CVN is tariffed in California under Advice Letter(s) 18399 and 17689. CVN is a set of features that improves the networking capabilities of customers connected to a telecommunications carrier's central offices. CVN is targeted toward multi-location/multi-switch subscribers with a requirement for internal network calling. The existing CVN product is designed for centrex and PBX applications.

The present invention relates to an improvement of CVN. The new service provides connectivity between multiple customer locations through the use of the PSTN instead of through a private network. Declining costs for usage of the PSTN and rising costs for private networks make CVN a desirable solution. However, the new service recognizes that there are some high volume situations in which use of private trunk groups and/or use of specific interexchange carriers (IXCs) for traffic across local access and transport areas (LATAs) is still preferable.

Among the main upgrades is an automatic selection of facilities-remote tie line (ASF-RTL) call routing system that routes telephone calls from a centrex or PBX system through the PSTN to a central hub that routes the calls over private facilities to accommodate an anticipated high volume of call traffic. The ASF-RTL call routing system enhances efficiency, especially for calls requiring special treatment, such as those passing through an international gateway or for calls from network locations having a relatively low volume of call traffic. The ASF-RTL system also provides alternative routing via the PSTN to accommodate overflow traffic from private trunk groups (i.e., tie lines), as necessary. The system simply and efficiently resolves the problems with current call routing.

Another main upgrade is usage billing treatment, which includes usage billing suppression (UBS) and usage billing reduction (UBR). Usage billing suppression determines whether a call is eligible for the UBS service and if so, zero rates usage on centrex intraLATA voice usage and charges this usage on a flat rate basis as a service feature charge. Usage billing reduction is available on PBX as well as on ASF-RTL calls. This feature allows flexible rating on intraLATA voice usage.

Another upgrade is outgoing call screening (OCS) based on privilege classes (PC). The present invention also permits data collected from the Advance Intelligent Network (AIN) service control point (SCP) to be made available to the company in the an SMDR format.

The present invention relates to a uniform/simplified dialing plan that allows customers to create their own abbreviated network dialing plan. The present invention also replaces current ETN dialing patterns and phone numbers. In addition, it adds features and functionality including: creating centralized ASF-RTL hub sites for aggregation of traffic to point of presence (POP) carrier connections or private backbone facilities and establishing privilege class levels for each outgoing call type (outgoing call screening (OCS)).

According to an aspect of the present invention, three different usage billing related options are provided. Centrex to centrex calls that are intraLATA voice calls are eligible for the usage billing suppression (UBS) option. According to usage billing suppression, when both the calling station and the called station are determined to be centrex stations, and the call is an intraLATA voice call, a unique billing record is generated. A billing system will detect the unique billing record, causing the record to be discarded.

PBX to PBX calls, PBX to centrex calls, and centrex to PBX calls, that are intraLATA voice calls are eligible for the usage billing reduction (UBR) option. According to usage billing reduction, when a call is between fully participating UBR provisioned PBX telephone numbers and UBS centrex telephone numbers, a unique billing record is generated. The billing system detects the unique billing record, causing the billing record to be adjusted according to specific customer contract terms. The adjustment can be from zero to 100% of the standard rate for similar calls.

The billing system also detects intraLATA voice calls routed to ASF-RTL centralized hub sites through a unique billing record. The detected billing record is then priced, according to specific customer contract terms, from zero to 100% of the standard price for such a call. This billing option will be referred to as RBR.

It should be noted and understood that the abbreviated dial plan of the present invention is a service in addition to the customer's existing service, i.e., centrex, PBX, etc. Because the abbreviated dial plan is an overlay, the customer must decide how many of their centrex stations or PBX trunks they want equipped with the additional features of the present invention.

An advantage of the present invention is that it centralizes an enterprise's dialing pattern choices, their routing choices and their call screening configurations. When the customer subscribes to each function, the customer will experience ease of dialing, selective routing, network optimization, outbound dialing disaster recovery for carriers or chosen routes as well as centralized management of outgoing call screening.

The present invention operates in an AIN environment, including switches such as 5ESS switches manufactured by Lucent Technologies, Inc., DMS-100 switches manufactured by Nortel Networks Corporation (Nortel), AXE-10 switches manufactured by Telefonaktiebolaget LM Ericsson, or EWSD switches available from Siemens Information and Communication Networks, Inc. The 5ESS switches may utilize an AIN Release 0.1 protocol and should be equipped with Generic 5E12 (or higher) software and associated AIN SSP features. The DMS-100 switches (release NA009) may utilize an AIN Release 0.1 protocol and associated AIN SSP features. Similarly, AXE-10 switches and EWSD switches may utilize an AIN Release 0.1 protocol.

An exemplary network in which the present invention may operate is now discussed with respect to FIG. 1. FIG. 1 shows a hybrid VPN-PN network architecture, but does not show the PSTN. Although the PSTN interconnects all centrexs and PBXs, the PSTN connections are not shown. All the trunk connections shown are private trunk connections.

FIG. 1 shows locations AA and AB, which use the present invention to route originating 7+ or 9+ dialed traffic over the PSTN. Location A has a dedicated private trunk group to one of the asynchronous transfer mode (ATM) switches. This connection is necessary because, for example, location A is very large, so the aggregated traffic is cheaper to move over a private trunk group to the ATM switch and the private network than it is over the PSTN. Location A is not using the functionality of the present invention.

Locations BA, and BB employ the features of the present invention to route the originating 7+ or 9+ dialed traffic over the PSTN. FIG. 1 shows location B having a dedicated private trunk group to one of the electronic tandem network (ETN) nodes. Similar to location A, the use of a private trunk group in conjunction with the ETN node is advantageous because location B is very large and at least a portion of the traffic is less expensive to move over a private trunk group to the ETN node and the private network than it is over the PSTN. Unlike location A, however, location B employs features of the present invention because at least a portion of the traffic is cheaper to move over the PSTN than it is over a private trunk group to the ETN node and the private network.

FIG. 1 also shows locations CA and CB, which have private trunks to location C. Thus, the customer is now using features of the present invention at locations CA and CB to route the originating 7+ or 9+ dialed traffic, but private trunks are still being used. Location C has a dedicated private trunk group to an ATM switch. This is because location C is very large and at least a portion of the traffic is cheaper to move over a private trunk group to an ATM switch and the private network than it is over the PSTN.

FIG. 1 shows an ASF-RTL hub near locations D, DA, and DB. This ASF-RTL hub provides locations D, DA, and DB with direct access to an international gateway IG and to an ATM switch. Note that locations D, DA, and DB do not include interconnecting private trunks because locations D, DA, and DB are relatively small and do not justify the expense of dedicated private trunk groups, as in the case of C, CA, and CB, for example. Therefore, traffic from locations D, DA, and DB rides PSTN trunks to the ASF-RTL hub, at which point the traffic is aggregated and routed over a private trunk group to the international gateway IG or the ATM switch, depending on the called party number. Furthermore, the ASF-RTL hub is tied to an ATM switch associated with locations C, CB, and CA and locations A, AA, and AB, providing ASF-RTL services to calls originating in these locations as well.

Figure 1A:
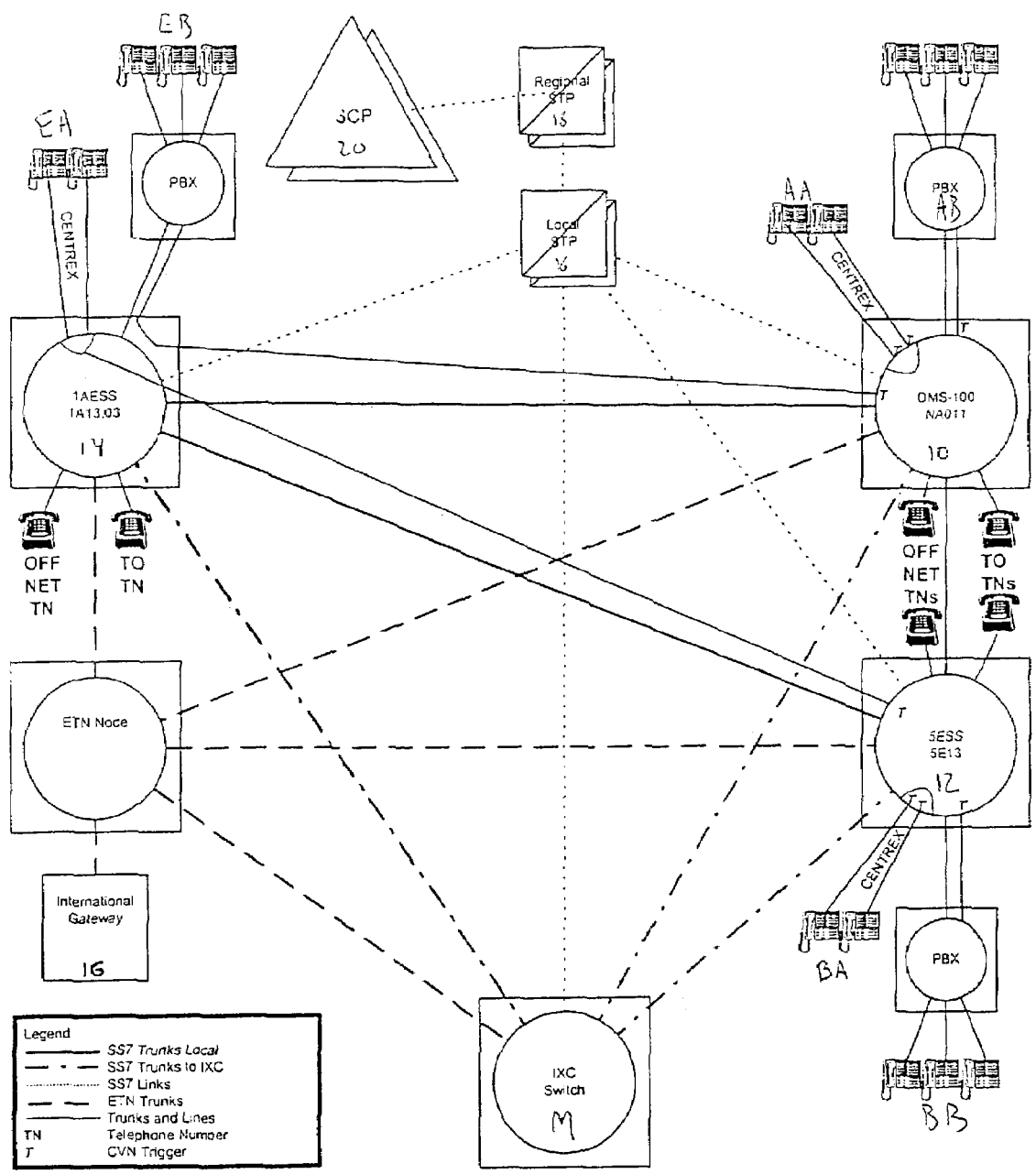
FIG. 1a is a block diagram showing a switch focused telecommunications network architecture, according to an aspect of the present invention.

The service switching points (SSPs) 10, 12, 14 supporting the network of FIG. 1 are shown in FIG. 1a. Triggers T are set in the switches 10, 12 for subscribing stations AA, AB, BA, BB. The stations EA, EB connected to switch 14 (and associated triggers T) are described below. In one embodiment, customized dialing plan-access code (CDP-AC) triggers are employed for all centrex stations. Most PBX stations, except for PBX stations having PBX trunks that are trunk side multi frequency trunks one way outgoing from the PBX, which do not send access codes, and except for PRI trunks, also use a CDP-AC trigger. The PBX stations having one way trunks use off hook delay (OHD) triggers. The PRI stations use PRIBC triggers. All triggers are based on originating telephone numbers.

The switches 10, 12 launch queries to a service control point (SCP) 20 via a local STP 16 and a regional STP 18. The SCP 20 translates abbreviated dialed numbers into numbers understood by the PSTN. These translations are highly centralized in that the translations only happen at the SCP 20, but because the responses are directed to the querying SSPs 10, 12, 14, the effect is highly decentralized: it is as if the SSPs 10, 12, 14 are doing the translations. The SSPs 10, 12, 14 also launch queries to the SCP 20 to effect other vertical features, such as ASF-RTL and UBS. Terminating only (TO) telephone numbers and Off-net telephone numbers are also shown in FIG. 1a. Off-net telephone numbers will be discussed below.

A terminating only telephone number is a telephone number that will not cause a trigger, thus preventing the end user of the terminating only telephone number from using a dialing plan. Terminating only telephone numbers, however, are listed in dialing plan tables. Consequently, the customer can prevent some triggering end users from reaching certain terminating only telephone numbers, while allowing other triggering end users to reaching those same terminating only telephone numbers. The control can be provided through outgoing call screening, described below. Terminating only telephone numbers can be for either customer controlled stations (which do not trigger) or stations not controlled by the customer, e.g., suppliers.

By way of example, the SCP 20 is implemented with a Bellcore Integrated Service Control Point and loaded with ISCP software Version 4.4 (or higher), available from Telecordia, Murray Hill, N.J. In an alternative embodiment of the invention, the SCP 20 may be a Lucent Advantage SCP, with software release 94, available from Lucent Technologies, Inc.

In the network of FIGS. 1 and 1*a*, some abbreviated dialed numbers are translated into long distance numbers that are routed to the IXC point of presence M over the PSTN. Thus, the calls are routed by the IXC switch M to the destination. Similarly, international calls are routed to the international gateway IG for routing to the international destination. Although a single IXC POP and single international gateway are shown, additional international gateways and IXC POPs can be provided, if desired.

All private trunks are multi-frequency (MF) and, hence, do not send the calling party number (CPN). However, the calls going over the PSTN have a high degree of likelihood of being carried end to end via SS7, and, hence, the calls deliver the calling party number if the CDN has Caller ID. That is, the trunks between end offices 10, 12, 14 are SS7 trunks. The links between the switches 10, 12, 14, M are SS7 links.

The present invention requires trunk groups from PBXs to a switch operated by the local exchange carrier (LEC) offering the features of the present invention. These trunk groups can be analog line-side one-way or two-way trunk connections, Super Trunk or PRI ISDN. In most cases the customer will be using PRI ISDN. In most cases (except for analog lines), these trunks operate as two-way trunks; dynamic allocation on PRI; and ascending-descending on Super Trunk. These trunks must tie into the local exchange carrier's provisioned switches in order to trigger an event associated with the present invention. In cases where this PBX traffic is handled by private facilities as part of the customer's private network, e.g., ATM network, it is understood that a local exchange carrier AIN provisioned central office is required to be the first entry point in order to begin any event associated with the present invention. If not, the features of the present invention will not be available to that station or trunk group.

Although the present invention may operate with 1AESS switches, manufactured by Lucent Technologies, Inc., in one embodiment, the 1AESS switches are not configured to provide the features of the present invention. For example, when the 1AESS switch is not AIN provisioned. Thus, if the customer has centrex or PBX connection service out of one of these switches, a trunk side connection is used to connect to an equipped switch, such as a DMS 100 or 5ESS digital switch 10, 12, where the triggers T are set. This is a trunk side connection to the nearest digital office. In FIG. 1*a*, switch 10 is closest to PBX stations EB, while switch 12 is closest to centrex stations EA. In addition, local traffic is sent back to the non-provisioned switch, e.g., the 1AESS, over the PSTN if the non-provisioned switch is the host switch for the called local telephone number.

In the case of independent local providers, the customer can use two devices to connect to the service. The customer can use either trunk group connections or a Link Extension. The Link Extension allows telephone numbers to be provisioned from the serving central office in which the Link Extension terminates. This would force number changes on these stations, however. The advantages to these two solutions should be weighed by the customer to determine which is most economical and effective from a cost and user standpoint. In all cases it is to be expected that the customer will bear the cost of any private lines run to connect to the service from tariffed products that are not part of the service.

Figure 2:
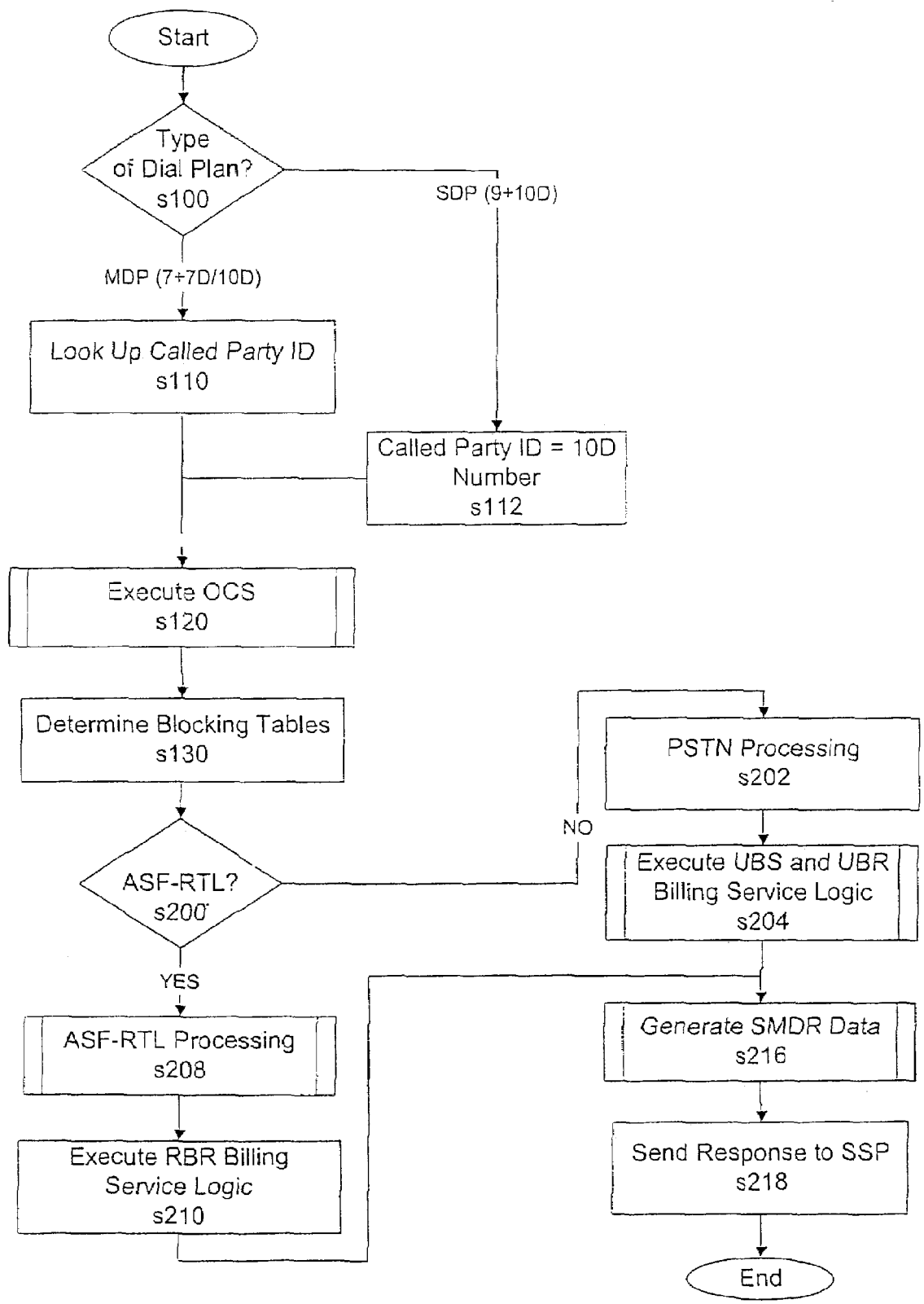
FIG. 2 is a flow chart showing an exemplary common service logic, according to an aspect of the present invention.

With reference to FIG. 2, a common service logic for processing all calls placed by the customer is now described. More detail will be provided about each of the major functions in later sections.

After the switch triggers and sends a query, the service control point (SCP) processes the trigger and transfers to the common service logic for the subscribing customer. The primary purpose of the triggers is to transfer the queries to the specific customer's common service logic.

The common service logic initially determines the type of dialing plan. A simplified determination includes ascertaining the dialed access code (e.g., "7" or "9") at step s100. For example, "7" can be associated with a manipulation dialing plan (MDP) and "9" can be associated with a special dialing plan (SDP). Although the following description is based on these associations, any access code may be associated with either dialing plan. Moreover, although two specific dialing plans are described, additional and alternate dialing plans are contemplated.

After the dialing plan is determined, the called number is determined. If the dialing plan was determined to be MDP, then at step s110 the called number is looked up in a table, based upon the dialed number. If the dialing plan was determined to be SDP, then at step s112 the called number is set to the 10 digit dialed number. After the called number is determined at either step s110 or s112, outgoing call screening executes at step s120. Subsequently, at step s130 blocking tables are determined.

After the blocking tables are determined at step s130, it is determined whether automatic selection of facilities-remote tie line (ASF-RTL) is applicable at step s200. If ASF-RTL is not active, at step s202 normal PSTN processing proceeds. Subsequently, at step s204 PSTN specific billing processing (i.e., usage billing suppression and usage billing reduction) occurs. On the other hand, if ASF-RTL is active, at step s208 the ASF-RTL processing occurs. Subsequently, ASF-RTL specific billing (i.e., RBR) logic executes at step s210. Finally, at step s216 SMDR data is generated and at step s218 the response is sent to the switch.

Dialing Plan

According to an aspect of the present invention, a custom dialing plan is subscribed to by the customer, and the fees the customer pays for the custom dialing plan are controlled by the UBS, UBR, and RBR billing functions. The custom dialing plan allows customers to create their own abbreviated network dialing plan. In one embodiment, the custom dialing plan consists of a combination of two dialing plans, the 7+ manipulation dialing plan (MDP) and 9+ special dialing plan (SDP). SDP recognizes that 7 digit dialing plans no longer give large companies the flexibility that they need. SDP provides the flexibility while offering access to vertical features like routing, OCS, billing, and reporting.

MDP abbreviated numbers begin with the access code 7+, and permit full manipulation. Full digit manipulation in MDP means the routing telephone number can be either 7 digits (7D) or 10 digits (10D) regardless of what 7 digit or 10 digit telephone number was dialed. There need not be any digits from the dialed telephone number in the routing telephone number. Thus, MDP tables are provided that map the dialed number to the routing number. This degree of flexibility supports 10 digit telephone numbers that may be either international or North American from the customer's perspective.

Examples of 7 digit and 10 digit dialing in MDP follow: Customer dials 969-2300 and the call is routed to 213-562-2345 or customer dials 1-213-969-2300 and the call is routed to 213-562-2345.

SDP uses 9+ as the access code, which is the access code to the public office dial plan (PODP). Thus, anything dialed after 9+ will be handled by the AIN. There is no digit manipulation much less full digit manipulation. The dialed telephone number is the routing telephone number. Operator Services, carrier identification code (CIC) calls, and miscellaneous N11 calls are simply passed through while access management is determined by privilege classes, which are discussed below.

According to the present invention, once the access code (9) or (7) has been dialed, the call will be routed out of the dialing party's local centrex or PBX. A second dial tone is thus required. It is understood that on any provisioned station or trunk group, dialing the leading digit (9) or (7) places the caller into the network of the present invention and therefore in the PSTN. If a private facility is the routing choice, the call will hit the SSP in the triggering central office prior to any routing.

The following rules apply in the custom dialing plan: On-net calls are defined as being between a provisioned station and a number listed in the dialing plan table(s) and are always reached by dialing one of the access codes. Off-Net calls are defined as being between a provisioned station and a number not listed in the dialing plan table(s) (i.e., Off-net telephone numbers in FIG. 1a). All calls On-Net and Off-Net are sent through outgoing call screening (discussed below) as appropriate. If the called number is not in one of the tables (i.e., the call is an Off-net call), the call is not eligible for usage billing suppression or usage billing reduction, although other features may apply.

In order for certain per station features, such as outgoing call screening and UBR, to operate on calls originating from a PBX telephone on a station rather than trunk group basis, a caller ID function will need to be activated on the ISDN PRI. Super Trunk and analog line side trunks either one way or two way will not have these features except on a trunk basis. It is noted that in the case of outgoing call screening, the caller ID function is provided by the PBX if the trunk is not PRI ISDN with the caller ID function. Moreover, intra-centrex calls and intraPBX calls will not trigger.

Outgoing Call Screening

According to an embodiment of the present invention, an outgoing call screening feature is provided. Outgoing call screening is a provisional optional feature implemented by service logic that executes within a SCP. That is, no centrex calls are screened in the switch. In addition, no PBX calls are screened in the switch or in the PBX. With the outgoing call screening feature, the subscriber assigns line restrictions by assigning privilege classes to each station subscribing to the abbreviated dialing plan. Privilege classes can be defined by the customer to include the types of calls that each privilege class can make. Privilege classes can be viewed as "how far" the user assigned to the privilege class can call. In one embodiment, outgoing call screening includes the following privilege classes for On-net and Off-net calls shown in Table 1. It is noted that each privilege class has access to all destinations associated with the privilege class, in addition to access to all destinations associated with the lower privilege classes.

TABLE 1

Privilege Classes

| Privilege Class | Privilege Title | Description of Privilege Areas |
|---|---|---|
| 8 | Emergency calling and unrestricted | Calls via an emergency private network |
| 7 | UNRESTRICTED | All areas-worldwide access, 01, 00, 0−, 0+ |
| 6 | Selected International Calls Off-net | Calls to international countries-same countries for entire privilege class |
| 5 | International Calls On-net | Calls to any On-net sites including international |
| 4 | All NANP Numbers Off-net | Calls to NANP Off-net numbers-same NANP for entire privilege class |
| 3 | IntraLata - Off-net | Calls to intraLATA numbers Off-net |
| 2 | Selected International Calls ON-net | Calls to customer designated international countries-same countries for entire privilege class |
| 1 | Domestic On-net | Calls within the MDP/SDP - On-net, 311, 411, 611, 911 |

According to an aspect of the present invention, blocking tables are provided and associated with privilege classes. In one embodiment, separate blocking tables are provided to block international calls, domestic calls, and toll free number (hereinafter referred to as 1-800 number) calls. An emergency function can also be provided, as can an international completion table, which lists selected international destinations that can be called from, for example, privilege class 2 stations in the exemplary configuration of Table 1. In an embodiment the blocking tables include up to 250 table entries.

Initially, a privilege class table is populated to define which call type codes (CTCs) are associated with each privilege class. A call type code indicates the classification of a call, e.g., an On-net international call. Thus, a YES/NO value must be indicated for each possible call type code, for each privilege class (PC). Table 2 shows an exemplary Privilege Class Table.

TABLE 2

PRIVILEGE CLASS TABLE

| Call Type Code | PC1 | PC2 | PC3 | PC4 | PC5 | PC6 | PC7 | PC8 |
|---|---|---|---|---|---|---|---|---|
| 101 | Y | Y | Y | Y | Y | Y | Y | Y |
| 109 | Y | Y | Y | Y | Y | Y | Y | Y |
| ... | | | | | | | | |
| 131 | N | N | N | N | Y | Y | Y | Y |
| 153 | N | Y | Y | Y | Y | Y | Y | Y |
| etc. | | | | | | | | |

In Table 2, call type code 101 represents On-net intraLATA calls. Call type code 109 represents On-net calls to 976 telephone numbers. Call type code 131 represents On-net interLATA domestic calls. Call type code 153 represents On-net selected international calls. Additional call type codes for each possible different call type can be defined and a corresponding value can be stored in the privilege class table for each privilege class.

Call type codes are predefined to readily identify all combinations of call types. The call type codes derive from a nature of number (NON) code. For example, in an embodiment of the invention, when the called party ID includes an NANP NON (e.g., 3), and the number plan area is 800, 888 or 877, the call type code may be determined by adding the value of 41 to an initial value. The initial value may be 100 when the called number is an On-net call and the initial value may be 200 when the called number is an Off-net call. Therefore, for an On-net 800 number, the call type code would be 141 and for an Off-net 800 number, the call type code would be 241. Call type code values can be assigned to any type of calls that may be encountered. All of the examples build on the NON and whether the called number is in On-net.

According to another embodiment of the present invention, an international completion table can also be provided. The international completion table stores a list of selected international numbers. Thus, privilege classes that permit completion to "selected" international numbers (e.g., privilege class 2) can dial these selected international numbers.

Subsequent to definition of the privilege class table, a privilege class control table must be defined. Table 3 shows an exemplary privilege control table. The privilege class control table indicates which (if any) blocking tables are associated with each privilege class. For example, privilege class 1 may be associated with an international blocking table, a domestic blocking table, and an 800 number blocking table. Accordingly, any user assigned to privilege class 1 will have all calls screened by each of the blocking tables. That is, if the dialed number is listed in any of the blocking tables, the call will not go through and a message is played to the user informing the caller of the blocking. A exemplary message is: "We're sorry but calls to that number cannot be made from your telephone. Please try again or contact your supervisor for instructions."

Exemplary blocking tables include a single column that stores all of the numbers to be blocked. The entries can be either country codes, complete international telephone numbers, 10 digit NPANXX telephone numbers, 6 digit NPANXXs, 3 digit NPAs, or complete 10 digit 800 telephone numbers.

TABLE 3

PRIVILEGE CONTROL TABLE

| PRIVILEGE CLASS BLOCKING | EMERGENCY | INTERNATIONAL BLOCKING | DOMESTIC BLOCKING | 800 |
|---|---|---|---|---|
| 1 | N | Y | Y | Y |
| 2 | N | Y | Y | Y |
| 3 | N | Y | Y | Y |
| 4 | N | Y | Y | Y |
| 5 | N | Y | Y | Y |
| 6 | N | Y | Y | Y |
| 7 | N | Y | Y | Y |
| 8 | Y | N | N | N |

An emergency calling feature can also be facilitated by the privilege control table. According to this embodiment, when emergency calling is in effect, all calls are blocked when a privilege class has a NO entry in the "Emergency" column (privilege classes 1-7 in Tables 1 and 3). If the entry for a privilege class is YES in the emergency column (privilege class 8 in Tables 1 and 3) then calls are not blocked when emergency calling is in effect.

The emergency calling feature operates to affect calling parties who are assigned a privilege class that normally allows calls to complete. When emergency calling is in effect, the affected calling parties are prevented from completing the normally allowed calls so that private trunk groups are available during emergencies for calling parties with the correct privilege class. Use of the emergency calling feature blocks most calling party numbers from completing calls. The calling party numbers not blocked will have their calls routed over the private trunk groups.

Emergency calling is valuable if the customer has a small private network to ensure critical traffic can get through when public emergencies are overloading the PSTN. In this case, the private trunk groups constituting this small private network are the first choice route in all switches for all triggering telephone numbers, with overflow set up to other private trunk groups, or to carriers, or to the PSTN.

In an embodiment, telephone numbers, such as 7 or 9+1+800NXX-XXXX, are available to all privilege classes and are typically not blocked unless identified in the 800 blocking table. On the other hand, all privilege classes are restricted from calling NPA-900 and NNX-976 numbers. Customer assigned NPA-900 and NNX-976 numbers that need to be accessed on a system wide basis are contained in the MDP table as terminating only telephone numbers or tables supporting SDP. Consequently, these customer assigned NPA-900 and NNX-976 numbers can be accessed. In CTC (outgoing call screening-Call Type Code) terms, 900/976 On-net is YES for all privilege classes (in the shown example), and 900/976 Off-net is NO for all privilege classes (in another exemplary embodiment).

The abbreviated dialing plan service subscriber may assign a privilege class to any centrex station. For PBX, the privilege class is assigned to the trunk group, unless the trunk group is primary rate ISDN (PRI) with a caller ID function provisioned per station.

Figure 3:
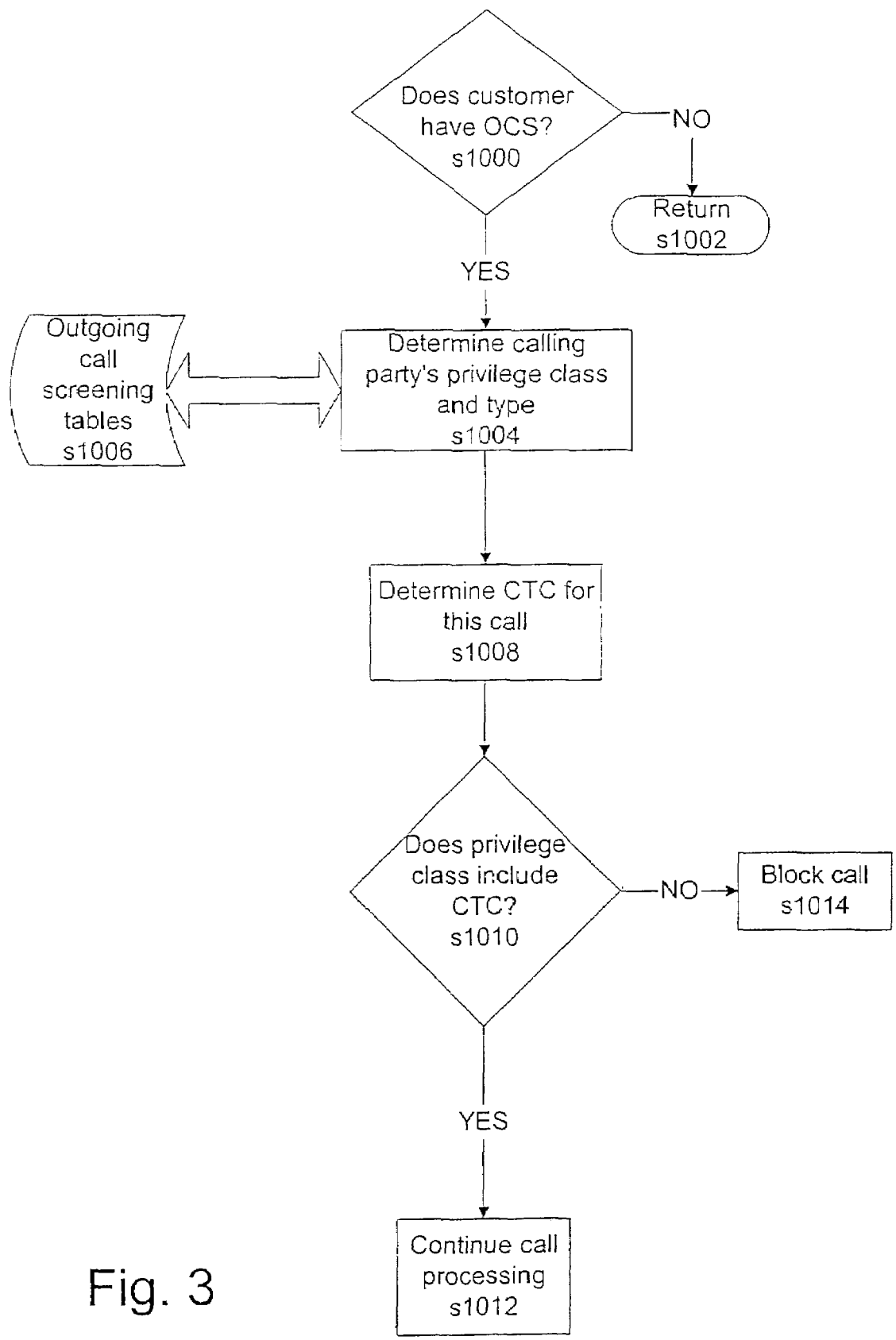
FIG. 3 is a flow chart showing an exemplary privilege class service logic, according to an aspect of the present invention.

With reference to FIG. 3, an exemplary logic flow to implement outgoing call screening is described. The logic is called from step s120 in FIG. 2. Initially, at step s1000 it is determined whether the customer subscribed to the outgoing call screening feature. If the customer did not subscribe to outgoing call screening, at step s1002 the logic returns to FIG. 2 to proceed. If the customer did subscribe to outgoing call screening, at step s1004 the calling party number's privilege class and type is determined. That is, the values are looked up in outgoing call screening tables 1006.

In one embodiment, the outgoing call screening tables include a single index table and multiple outgoing call screening tables. The index table is used to determine which outgoing call screening table stores the 10 digit calling party number based on some portion of the NPANXX of the calling party number. Each outgoing call screening table stores a portion of the 10 digit calling party numbers, depending on the capacity of the table structure and logical groups that may be made based on the first digit, first two digits, first three digits, first four digits, first five digits, and first six digits, such that the capacity is not exceeded.

The correct outgoing call screening table is identified by searching the index table. The search uses the NPANXX of the calling party number to find the name of the outgoing call screening table. If the name is found, the identified outgoing call screening table is searched to find the corresponding privilege class. Otherwise, the NPANX of the calling party number is used. If the name is found, the identified outgoing call screening table is searched to find the corresponding privilege class. Otherwise, the NPAN of the calling party number is used. If the name is found, the identified outgoing call screening table is searched to find the corresponding privilege class. Otherwise, the NPA of the calling party number is used. If the name is found, the identified outgoing call screening table is searched to find the corresponding privilege class. Otherwise, the NP of the calling party number is used. If the name is found, the identified outgoing call screening table is searched to find the corresponding privilege class.

If the name is still not found, the N of the calling party number is used. If the name is found, the identified outgoing call screening table is searched to find the corresponding privilege class. Otherwise, the called party ID is set to the 10 digit telephone number of a standard vacant number announcement, and the standard vacant announcement is played. Subsequently, the logic proceeds to step s218 in FIG. 2. In this last case, a provisioning error occurred. That is, the calling party number was not added to the correct outgoing call screening table with the privilege class.

In each of the above cases, if no corresponding privilege class is found in the identified table, a default privilege class is assigned. In addition, the outgoing call screening table identifies each calling party number as either PBX, centrex, or terminating only. Thus, a call type variable (not to be confused with the call type code) associated with the calling party number is set in accordance with the corresponding call type determined from the outgoing call screening table.

After the privilege class and type are identified, at step s1008 the call type code is determined. The determination is described in detail later. After the call type code is determined, it is determined whether the privilege class includes the call type code, at step s1010. More specifically, the privilege class determined at step s1004 and the call type code determined at step s1008 are used to perform a lookup in the privilege class table. If the lookup returns a YES, at step s1012 the call continues processing according to the logic of FIG. 2, i.e., the logic flows to step s130. If the lookup returns a NO, at step s1014 the call is blocked and the appropriate announcement is played.

As indicated in FIG. 2, the blocking tables are determined next at step s130. The blocking tables feature requires an entry in the privilege control table, blocking tables listing the numbers to which calls are to be blocked, and service logic. The service logic checks, on a real time basis, the dialed number to see if the dialed number should be blocked.

More specifically, when the call type code corresponds to one of the blocking table types (e.g., international, domestic, and 800), the common service logic looks up a value in the privilege control table. Next, it is determined if the called number corresponds to one of the blocking table types. That is, it is determined whether the called number is an 800 number, domestic number, or international number. If the called number corresponds to one of the blocking tables, it is then determined from the privilege control table whether a YES value corresponds to the privilege class. If a YES value is found, the called number is validated against the appropriate blocking table. Otherwise, if a NO value is found in the privilege control table, validation of the called number is bypassed.

In one embodiment, validation of international numbers occurs by first checking the entire dialed number to see if it is in the international blocking table. If the dialed number is in the international blocking table, an announcement is played informing the caller that the call is blocked. If the dialed number is not found, the first three digits of the dialed number are searched in the international blocking table. If the first three digits of the dialed number are in the international blocking table, an announcement is played informing the caller that the call is blocked. If the first three digits of the dialed number are not found, the first two digits of the dialed number are searched for in the international blocking table. If the first two digits of the dialed number are in the international blocking table, an announcement is played informing the caller that the call is blocked. If the first two digits of the dialed number are not found, the first digit of the dialed number is searched for in the international blocking table. If the first digit is not found, the international blocking table logic is complete and the call can proceed. If the first digit is found, an announcement is played informing the caller that the call is blocked.

In one embodiment, validation of domestic numbers occurs by first checking the NPANXXXXXX to see if it is in the domestic blocking table. If the NPANXXXXXX is in the domestic blocking table, an announcement is played informing the caller that the call is blocked. If the NPANXXXXXX is not found, the NPANXX of the dialed number is searched for in the domestic blocking table. If the NPANXX of the dialed number is in the domestic blocking table, an announcement is played informing the caller that the call is blocked. If the NPANXX of the dialed number is not found, the NPA of the dialed number is searched for in the domestic blocking table. If the NPA of the dialed number is in the domestic blocking table, an announcement is played informing the caller that the call is blocked. If the NPA of the dialed number is not found, the domestic blocking table logic is complete and the call can proceed. If the NPA is found, an announcement is played informing the caller that the call is blocked.

In one embodiment, validation of 800 numbers occurs by first checking the 800NXXXXXX to see if it is in the 800 blocking table. If the 800NXXXXXX is in the 800 blocking table, an announcement is played informing the caller that the call is blocked. If the 800NXXXXXX is not found, the 800NXX of the dialed number is searched for in the 800 blocking table. If the 800NXX of the dialed number is in the 800 blocking table, an announcement is played informing the caller that the call is blocked. If the 800NXX of the dialed number is not found, the 800 blocking table logic is complete and the call can proceed.

ASF-RTL

Figure 4:
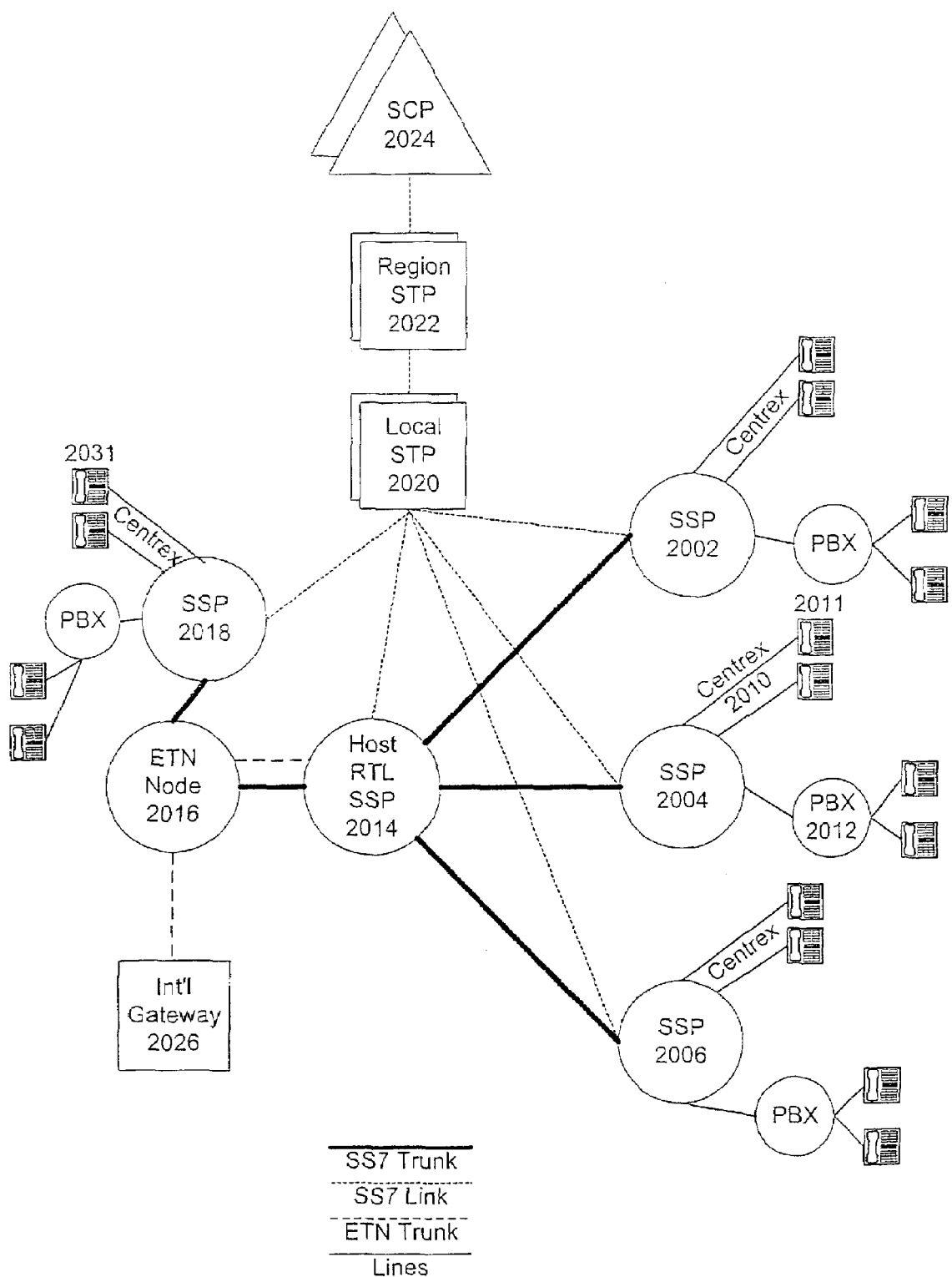
FIG. 4 is a block diagram showing an exemplary telecommunications network for implementing an automatic selection of facilities-remote tie line (ASF-RTL) feature, according to an aspect of the present invention.

FIG. 4 illustrates isolated portions of an exemplary telecommunications network in association with the present invention, for implementing the ASF-RTL feature in particular. The network includes originating service switching points (SSPs) 2002, 2004 and 2006. SSP 2004 is shown to have a corresponding centrex system 2010, including calling party telephone 2011, and a PBX 2012. The other SSPs 2002 and 2006 likewise have associated centrex systems and/or PBXs, although they are not described further. Also shown in FIG. 4 is an ASF-RTL host SSP 2014 and an ETN node 2016. The ETN node 2016 is connected to a terminating SSP 2018 in a private network separate from that in which SSPs 2002, 2004 and 2006 are located, as well as an international gateway 2026. The telecommunications network also includes a local signal transfer point (STP) 2020, a regional STP 2022 and a service control point (SCP) 2024.

The present invention operates in an AIN environment. All of the switches, including SSPs 2002, 2004, 2006 and 2018 and the ASF-RTL host SSP 2014 are therefore AIN compatible switches, such as the 5ESS, or the DMS-100 switches. All of the switches are configured to receive and transmit either 7 digit or 10 digit SS7 signaled messages. The operation of ASF-RTL, is dependent on the transmission of 10 digit SS7 signaling such that the true called party number (CDN), originally dialed by the calling party, can be ultimately transmitted. The ETN node is likewise a 5ESS or DMS-100 switch in an embodiment of the invention. In an alternative embodiment, an ATM switch is substituted for the ETN node. The ATM switch performs a function similar to the ETN node with respect to the present invention, and may be a MainStreetXpress 36170 Multiservices Switch or 670 RSP, both manufactured by Newbridge Networks Corporation; a GX 550 Smart Core ATM Switch, manufactured by Lucent Technologies Inc.; or a Passport 15000 Multiservice Switch, manufactured by Nortel Networks Corporation.

For purposes of description, SSP 2004 is an exemplary originating central office (CO) for the calling party telephone 2011 and SSP 2018 is the terminating central office for the called party telephone 2031. SSP 2014 is the host central office for the ASF-RTL system, and has a unique telephone number accessible by the originating central office 2004. Generally, the SSPs supporting the network shown in FIG. 4 launch queries to the SCP 2024, via STPs 2020 and 2022 over SS7 signal links (shown as small dashed lines), which translates abbreviated dialed numbers into numbers understood by the PSTN. These translations are highly centralized in that they only occur at the SCP 2024, but because the responses are directed to the various querying switches, the practical effect is highly decentralized.

Also shown in FIG. 4 are the various connections among the system elements. All private trunks, shown connecting the ETN node 2016 with the ASF-RTL host SSP 2014 and with the international gateway 2026, are multi-frequency (MF) trunks (shown as large dashed lines). Therefore, they do not send the calling party number (CPN). However, calls going over the PSTN have a high degree of likelihood of being carried end-to-end via SS7 trunks (shown by as bold lines) and SS7 links (shown as small dashed lines), and hence, the calls deliver the calling party number if the called number has associated services requiring this data, such as caller ID or incoming call screening.

The present invention requires trunk groups from the centrex and PBX sites to a switch (shown as thin solid lines), operated by the local exchange carrier (LEC). These trunk groups can be analog line-side one-way or two-way trunk connections, Super Trunk or PRI ISDN. These trunks tie into the LEC's provisioned switches in order to trigger an event associated with the present invention. In cases where this traffic is handled by private facilities as part of the customer's private network, it is understood that a local exchange carrier AIN provisioned central office is required to be the first entry point in order to begin any event associated with the present invention.

According to the present invention, three types of routing are provided: centralized route selection (CRS), centralized carrier selection (CCS) and ASF-RTL. These features are based on the protocol of AIN R0.1, and permit the SCP to send up to three private truck groups and three carrier identification codes (CICs) in one response to an SSP query. Any private trunk groups returned by the SCP to a switch take precedence over any CICs returned at the same time. These features allow integration of a private network as the customer may desire for reasons either based on economics or service criticality.

Centralized route selection integrates private facilities into the service of the present invention. Centralized route selection allows up to three route selections per destination. Routing may also be based on time of day/day of week (tod/dow) decisions, type of call (CTC), number plan area (NPA), date, and percentage allocation.

Centralized carrier selection allows up to three carrier selections per line. It provides two alternate carrier selections in case of failure on the primary carrier's network. Centralized carrier selection also allows the customer to use multiple carriers on a tow/dow basis, as well as CTC, NPA, date, and percentage allocation routing.

ASF-RTL is the third possible type of call routing, which combines trunk group and carrier selections. It is available regardless of whether the call is dialed using MDP or SDP. Generally, under ASF-RTL, call traffic from an originating SSP is directed to a centralized hub node, referred to as an ASF-RTL host SSP, via the PSTN. The ASF-RTL host SSP must have an assigned telephone number for routing purposes. From the ASF-RTL host SSP, the calls are routed to either private facilities (i.e., private trunk groups), carrier facilities (i.e., an IXC POP), or an international gateway. The call destination determines which calls will be routed to the ASF-RTL host SSP, described below. Generally, calls identified as routing to the ASF-RTL host SSP are all international calls and calls directed to major PBX or centrex sites, inside or outside the LATA of the originating number.

Routing features within the ASF-RTL system allow the customer maximum flexibility in choosing private facilities or the PSTN, using existing lines, or allowing the customer to establish new routing based on cost effectiveness between locations. In the event that the traffic crosses LATA boundaries, the call must be able to be completed by an interexchange carrier. In the event of congestion or failure on the ASF-RTL facilities, the call will receive an all circuits busy signal. Carrier selection can also be used to route traffic away from the ASF-RTL telephone number in an overflow situation (if the routing can be performed over the PSTN).

Referring to FIG. 4, ASF-RTL recognizes that most small locations have no need for a direct, private trunk group from that location to an ETN node (or ATM switch). However, even without direct private trunk groups, the traffic from the small locations tends to go the same ETN node. For example, without the ASF-RTL service, calls over the PSTN passing through originating switches 2002, 2004 and 2006 would naturally pass through a common switch, such as ASF-RTL host SSP 2014, to reach the ETN node 2016. If the call traffic were placed on direct private trunk groups, the direct private trunk groups would eventually run parallel to each other, beginning at the common switch.

Therefore, ASF-RTL permits the call traffic from most small locations to "ride" the PSTN until the point where the parallel trunk groups would likely begin (i.e., host SSP 2014). At that point, a private trunk group, i.e., "tie line," connects the ASF-RTL host SSP 2014 to the ETN node 2016, indicated by the large dashed line between SSP 2014 and ETN node 2016 in FIG. 4. Because the calls from multiple locations are aggregated at the SSP 2014, there is sufficient traffic to justify the expense of incorporating a private trunk group beyond that point. Meanwhile, the SS7 trunk, shown by the bold line between SSP 2014 and ETN node 2016, is still available to handle any overflow traffic, as determined by the ASF-RTL service logic, discussed below.

From an AIN perspective, the call traffic subject to ASF-RTL routing is identified when the originating trigger occurs at SSP 2002, 2004, or 2006. The trigger information is ultimately received by the intermediate terminating SSP 2014, which hosts the start of the private trunk group. The traffic is placed on the aggregating private trunk group by means of a route index, for example.

Therefore, when ASF-RTL is active, the SCP 2024 receives a query from an originating switch (e.g., SSP 2004), which includes the true "called party number" (e.g., the telephone number of the destination telephone 2031). The SCP 2024 returns the called party number to the originating switch as a redirecting number (RDN), along with a number of the switch hosting the private ASF-RTL facility group to be entered (e.g., SSP 2014) as the new called number.

Therefore, the parameters appearing in the SS7 message at the SSP 2014, hosting the ASF-RTL telephone number, include a calling party ID (i.e., the 10 digit originating telephone number), the called party ID (i.e., the 10 digit ASF-RTL telephone number) and the original called party ID (i.e., the number originally dialed and set as the redirecting number in the originating SSP).

The ASF-RTL host SSP 2014 will then trigger an SCP, which for purposes of discussion is SCP 2024, although any compatible SCP in the servicing area is suitable.

The SCP 2024 executes service logic, which mimics outgoing call screening's service logic, to obtain call type codes and routing options to determine which facility grouping to use. The logic is described in detail below. Normally, a facility grouping will have one to three route indices for private trunk groups, but it may also have one or more CICs for overflow purposes. The service logic discerns interLATA from intraLATA connections, so that the overflow CICs can be IXCs for interLATA and private networks for intraLATA, for example. Finally, the SCP 2024 responds to the query with the redirecting number received in the query from the originating SSP 2004 as the CDN. As in centralized route selection and centralized carrier selection, ASF-RTL may include routing according to type of call, NPA, specific dates, day of week, time of day, and percentage allocation.

Figure 5:
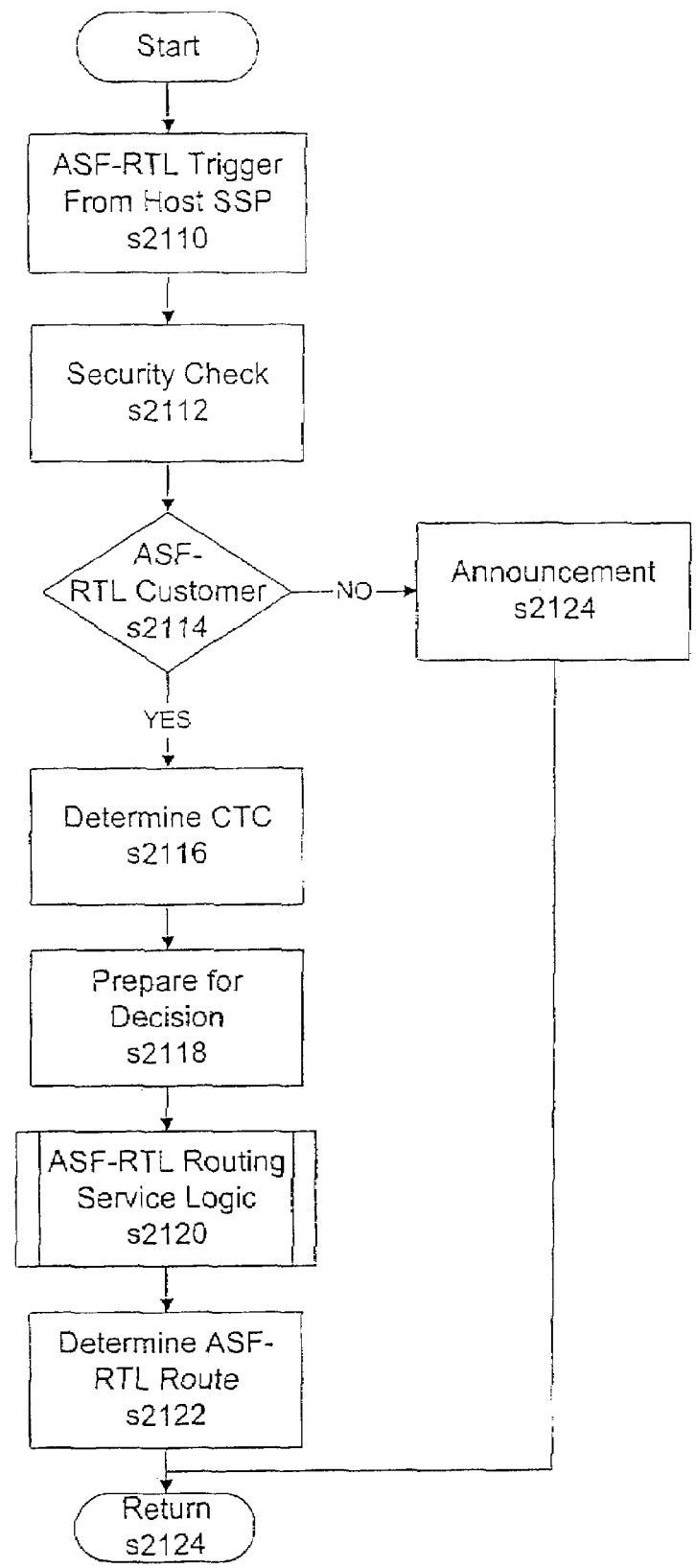
FIG. 5 is an exemplary flow chart of the ASF-RTL service logic, according to an aspect of the present invention.

FIG. 5 shows a flowchart of the ASF-RTL service logic executed by the SCP 2024 to route call traffic according to the present invention. The ASF-RTL service logic is initiated when the SCP 2024 executes step s208 of FIG. 2. Generally, automatic selection of facilities (ASF) is a technical vertical feature for providing centralized route selection, centralized carrier selection, or ASF-RTL, which apply to call routing. ASF bundles the features so that routing can efficiently be determined on a per call basis. ASF-RTL is exclusive of centralized route selection and centralized carrier selection, so the steps of FIG. 5 are executed once the decision has been made to follow ASF-RTL as opposed to the alternative call routing services: centralized route selection and centralized carrier selection.

ASF is dependent on the originating location. When a call is placed, the common service logic determines whether ASF exists at the originating telephone number, and if so, whether ASF-RTL is available for routing. If ASF-RTL is available, the ASF-RTL service logic of FIG. 5 is initiated by the SSP hosting the ASF-RTL telephone number (i.e., ASF-RTL host SSP 2014). The ASF-RTL host SSP 2014 triggers at step s2110 and sends a query to the SCP 2024. Each ASF-RTL telephone number has its own trigger, although the ASF-RTL service logic is common to all ASF-RTL telephone numbers for a specific customer.

At step s2112 a security check is performed by the SCP 2024. Generally, a security check is not necessary because an ASF-RTL telephone number does not send a query unless appropriately triggered. However, it is possible to dial the ASF-RTL telephone number of the host switch directly (i.e., from outside the call routing service). For example, telemarketers may dial the ASF-RTL telephone number even though it is not a public number. The security check therefore assures that a call entering the ASF-RTL host switch 2014 is initiated from an authorized workstation. Because the telephone number will trigger for all calls to it, the security is based on the calling party number.

In an embodiment of the invention, the security check begins with the ASF-RTL service logic validating the calling party. If the calling party is not authenticated (s2114: NO), an announcement notifying the caller that the call cannot be completed is set and a return response is sent to the SSP 2014. The SSP 2014 plays an announcement (e.g., the announcement of step s2124), stating that the attempted call is not authorized.

Once the called party is authenticated (s2114: YES), the ASF-RTL service logic obtains the nature of the number (NON) indicated by the called party ID. For example, NON may be a 4 to indicate an international call, a 3 to indicate a North American Numbering Plan (NANP) call, and a 1 for a intra-customer network call.

After authentication, the ASF-RTL service logic determines the call type code (CTC) at step s2116. Determining the call type code is accomplished by separate service logic, which is unique to each customer. However, the same call type code service logic is used to trigger all telephone numbers of the customer, including the ASF-RTL telephone numbers, in order to ensure consistent call type code determinations for the same call regardless of the features included with the call. The call type code service logic ultimately returns the call type code to the ASF-RTL service logic.

The ASF-RTL system processes calls according to the call type code. For example, in one embodiment of the invention, call type codes indicating intraLATA centrex to centrex, centrex to PBX, and PBX to PBX calls, calls to 800 numbers, On-net 900/976 calls, Off-net local calls, Off-net CIC calls, and operator assist calls are allowed to complete over the PSTN. Consequently these types of calls are not routed to the ASF-RTL telephone number. Call type codes indicating calls to Off-net 900/976 telephone numbers are blocked, requiring no route selection processing. The remaining call type codes, including call type codes indicating international calls and interLATA domestic calls, are routed to the ASF-RTL telephone number. Examples of call type codes subject to ASF-RTL processing, according to the present example, include 101 (On-net, intaLATA), 151 (On-net, international), 252 (Off-net international), 131 (On-net, intrastate, interLATA) and 231 (Off-net, intrastate, interLATA).

Once the call type code has been determined, the ASF-RTL service logic prepares data for the routing decision options at step s2118 of FIG. 5. Each ASF-RTL telephone number has its own associated routing decision logic. Therefore, step s24118 ensures that the necessary internal call variables exist and are properly passed to the ASF-RTL routing service logic at step s2120. The necessary call variables include an originating-location variable, which is set by the service logic to equal the ASF-RTL telephone number. Another call variable contains the results of the ASF-RTL routing decision. The ASF-results call variable has a default value of zero, which indicates that the response to the SSP is to include only the called party ID (which has been set back to the called number) as the PSTN default route.

Figure 6:
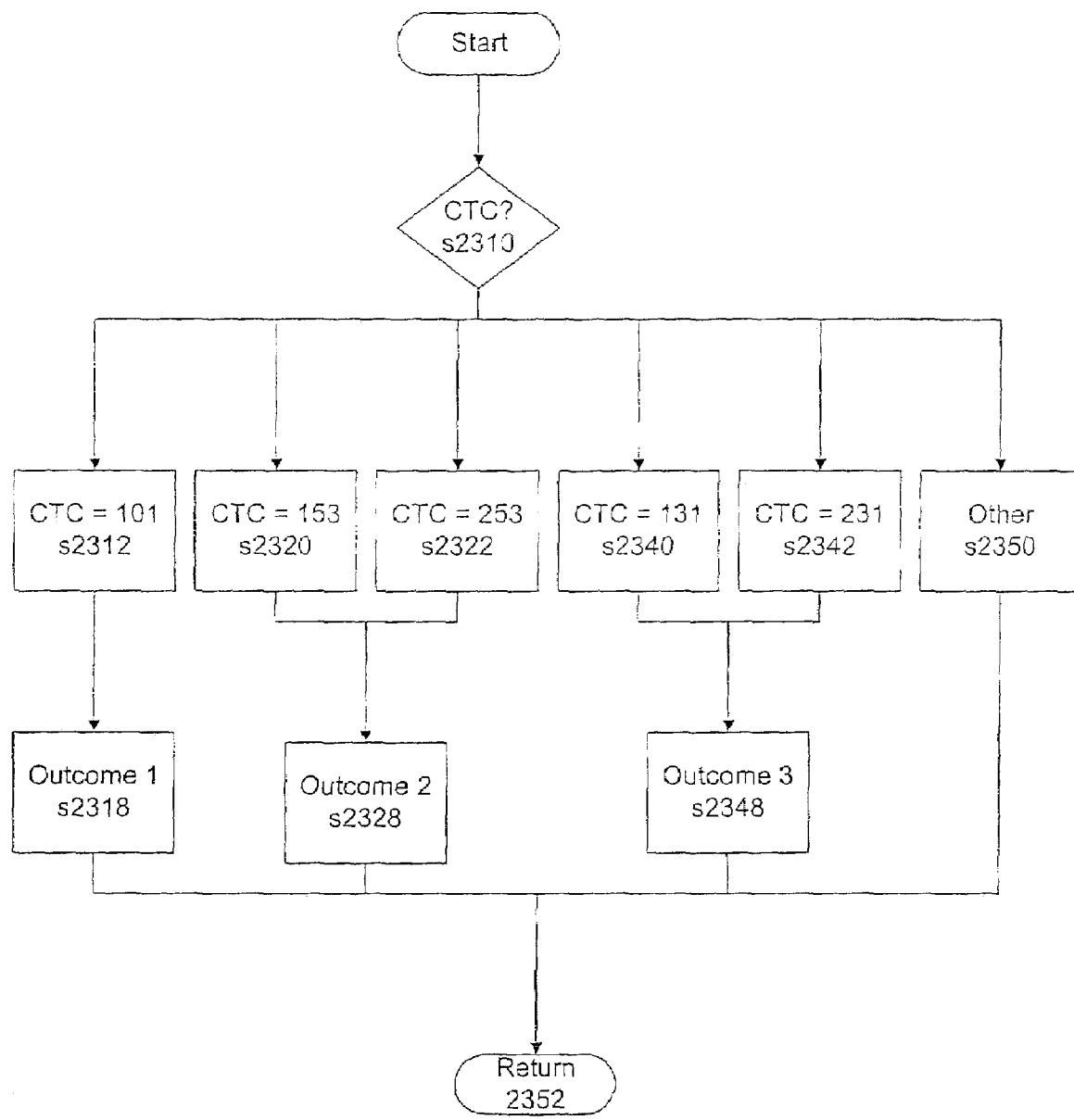
FIG. 6 is an exemplary flow chart of the ASF-RTL routing service logic, according to an aspect of the present invention.

Once the variables have been set, the ASF-RTL service logic passes control to the ASF-RTL routing service logic at step s2120. Step s2120 is the most flexible aspect of ASF-RTL and does not follow prescribed paths. The purpose of the ASF-RTL routing service logic is to return an outcome to the ASF-RTL service logic for determining the route of a call. The ASF-RTL routing service logic is a series of logic decision nodes and branches provisioned on a custom basis for each location, resulting in multiple branch ends, as indicated in FIG. 6. Each branch end may alone be an outcome, or branch ends may be tied together to share an outcome. If any of the possible results reach a return node, returning to the ASF-RTL service logic, without specifying an outcome, a default occurs, resulting in blocking of the call.

Each outcome determined by the ASF-RTL routing service logic must be matched by a row in an ASF-RTL table stored at the SCP 2024, which includes at least an entry for the originating-location call variable and a destination-location call variable. In an embodiment, the ASF-RTL table also includes trunk and carrier options, such as a primary trunk, an alternate trunk, and a second alternate trunk, and a primary carrier, an alternate carrier and a second alternate carrier. An exemplary ASF-RTL table is shown in Table 4, below.

come returned from step s2120, identifying the value of the destination-location call variable and determining whether the value is still the default value. If there is a value other than the default value, a look-up in the ASF-RTL table is performed. If the destination-location call variable is the default value, then the look-up in the ASF-RTL table is skipped.

The ASF-RTL table contains rows of data corresponding to the destination-location and originating-location call variables. Table 4 is an exemplary ASF-RTL table, showing possible table entries corresponding to the outcomes produced by the ASF-RTL routing service logic, according to one embodiment of the invention:

TABLE 4

| Originating Location | Destination Location | Prim. Trunk | Alt. Trunk | 2nd Alt. Trunk | Pri. Carrier | Alt. Carrier | 2nd Alt. Carrier |
|---|---|---|---|---|---|---|---|
| (925) 789–5678 | TG | 0000–0174 | | | | | |
| (925) 789–5678 | TGCIC | 0000–0174 | 0000–0174 | | 0222 | | |
| (925) 789–5678 | TGCIC2 | 0000–0174 | 0195–2000 | 0000–0180 | 0222 | 0333 | 0388 |

Execution of the ASF-RTL routing service logic of step s2120 results in an outcome corresponding to a destination-location call variable, which identifies the route for reaching the destination of the call (i.e., the called number). The default value of the destination-location call variable is none, or zero. Any value other than default is assigned at a branch end of the decision options determining the outcome, as shown in FIG. 6. If the default value is not changed by the execution of the ASF-RTL routing service logic, the call will be blocked.

Determination of the destination-location call variable is based on the call type code of the called number, indicated at step s2310 of FIG. 6. Alternatively, determination of the destination-location call variable can be based on time of day/day of week, or any other factor, instead of the call type code. The call type code has previously been determined at step s2116 of FIG. 5. The ensuing processing results in one of three possible outcomes, in the depicted embodiment of the invention, each providing a distinct destination-location call variable. For example, if the call type code indicates an On-net intaLATA call (e.g., 101), the process proceeds to blocks s2312, which results in setting the destination-location variable at s2318 to Outcome 1. If the call type code indicates a selected On-net international call, such as 153 or selected Off-net international call (e.g., 253), the process proceeds to blocks s2320 and s2322, respectively, which result in setting the destination-location call variable at s2328 to Outcome 2. Lastly, if the call type code indicates an On-net interLATA domestic call, such as 131, or an Off-net interLATA domestic call, such as 231, the process proceeds to blocks s2340 and s2342, respectively, which result in setting the destination-location call variable at s2348 to Outcome 3. If the call type code is some other call type not subject to ASF-RTL processing, at step s2350 no outcome is determined and the call is default routed to the PSTN. All of the outcomes, including default indications, are returned at s2352 of FIG. 6, returning the process to step s2120 of FIG. 5.

At step s2122 of FIG. 5, the ASF-RTL route is determined using the call variables previously generated. This step begins with the ASF-RTL service logic checking the out- The rows of Table 4 include the designated trunks and carriers associated with the destination-location call variable (and associated originating-location call variable). The various values are simply examples of predetermined identification numbers corresponding to desired trunk group and carriers. A successful look-up of the ASF-RTL table produces a trunk and/or a carrier for call routing. If a row of data is not retrieved, a critical error has occurred that will result in an appropriate announcement being played by the SSP.

Because the ASF-RTL system supports up to three private trunk groups, the table may include an alternate trunk group and a second alternate trunk group, in addition to the primary trunk group. The alternate trunk group entry can appear only when a primary trunk group is provided; likewise, the second alternate trunk group entry can appear only when an alternate trunk group is provided. Similarly, because the ASF-RTL system supports up to three carriers, the table may include an alternate carrier and a second alternate carrier group, in addition to the primary carrier, to handle call overflow situations. The alternate carrier entry can appear only when a primary carrier is provided; likewise, the second alternate carrier entry can appear only when an alternate carrier is provided. The three carriers are included for overflow situations in which the three private trunk groups specified are busy.

The three rows of data in Table 4 correspond to Outcome 1, Outcome 2 and Outcome 3 of FIG. 4, respectively. Outcome 1 is simply a private trunk group (e.g., the primary trunk), which is consistent with an On-net intraLATA call. In particular, On-net intraLATA calls stay on private trunk groups because an outside carrier would not have the requisite logic to handle such calls. Therefore, when a call type code value indicates an On-net intraLATA call, the destination-location entry in the ASF-RTL table does not have any associated carrier entries. Outcome 2 is a trunk group/CIC combination, including primary and alternate trunk group identification numbers and primary and secondary carrier values. Outcome 3 is a trunk group/CIC combination, including primary, alternate and second alternate trunk group identification numbers and primary, alternate and second alternate carrier values.

The ASF-RTL service logic checks the values of the trunk group and carrier call variables to ensure that the row of the ASF-RTL table is valid. If either the primary trunk group entry or the primary carrier entry has a value, the row is deemed valid and the ASF-results call variable is set. If both the primary trunk group entry and the primary carrier entry are blank, the row is deemed invalid and an appropriate announcement is instructed to be played by the ASF-RTL host SSP.

The ASF-results call variable is set to a predetermined number indicating the number of trunk and carrier entries existing in the row corresponding to the destination-location table entry. Table 5 is an exemplary ASF-results table, showing possible entries according to one embodiment of the invention:

TABLE 5

| ASF-Results: | 1 | 2 | 3 | 10 | 11 | 12 | 13 | 20 | 21 | 22 | 23 | 30 | 31 | 32 | 33 |
|---|---|---|---|---|---|---|---|---|---|---|---|---|---|---|---|
| Pri. Trunk | x | x | x |  | x | x | x |  | x | x | x |  | x | x | x |
| Alt. Trunk |  | x | x |  |  | x | x |  |  | x | x |  |  | x | x |
| 2d Alt. Trunk |  |  | x |  |  |  | x |  |  |  | x |  |  |  | x |
| Pri. Carrier |  |  |  | x | x | x | x | x | x | x | x | x | x | x | x |
| Alt. Carrier |  |  |  |  |  |  |  | x | x | x | x | x | x | x | x |
| 2d Alt. Carrier |  |  |  |  |  |  |  |  |  |  |  | x | x | x | x |

In the embodiment of the invention depicted by Table 5, the ASF-results values are determined according to the number of routing parameters provided for a particular option in the ASF-RTL table (Table 4). The ASF-results values, indicated in the first row of Table 5, are significant in that the ASF-RTL host SSP 2014 will use only those routing parameters indicated to be available by the ASF-results values. For instance, an ASF-results variable having a single digit value of 1, 2 or 3, or a double digit value with a 1, 2 or 3 as the second digit (i.e., 11, 12, 13, 21, etc.), indicates a primary trunk group is available. An ASF-results variable having a single digit value of 2 or 3, or a double digit value with a 2 or 3 as the second digit, indicates that an alternate trunk group is available. An ASF-results variable having a single digit value of 3, or a double digit value with a 3 as the second digit, indicates that a second alternate trunk group is available.

Similarly, with respect to carriers, an ASF-results variable having a double digit value with a 1, 2 or 3 as the first digit (e.g., 10, 20, etc.), indicates that a primary carrier is available. An ASF-results variable having a double digit value with a 2 or 3 as the first digit, indicates that an alternate carrier is available. An ASF-results variable having a double digit value with a 3 as the first digit, indicates that a second alternate carrier is available. Using this coding, the ASF-results variable for Outcome 1, Outcome 2 and Outcome 3 of Table 4 would be 1, 12 and 33, respectively.

The ASF-RTL service logic returns the ASF-results variable to the common service logic, along with the parameters of the trunks and carriers for call routing, at step s2124 of FIG. 5. The SCP 2024 directs the call through instructions to the ASF-RTL host SSP 2014 using these values, along with the calling party ID.

Figure 7:
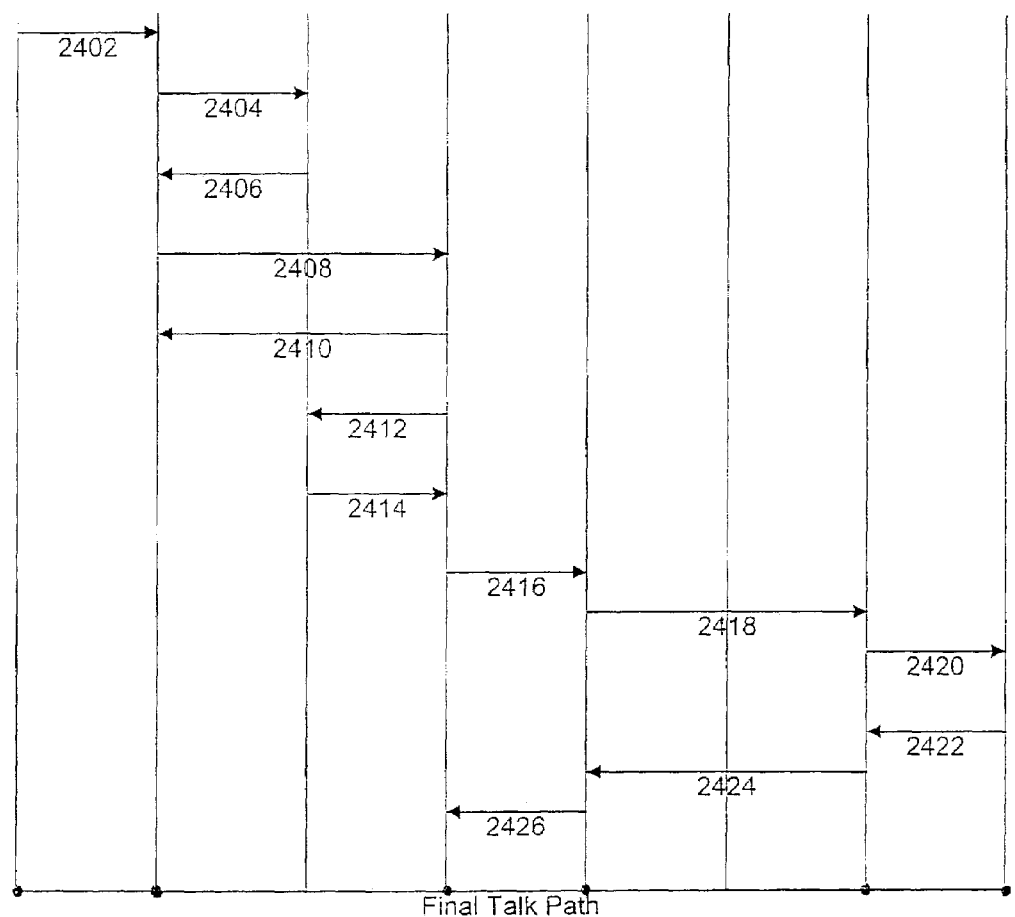
FIG. 7 is an exemplary call flow diagram showing routing of a telephone call through the ASF-RTL system, according to an aspect of the present invention.

An exemplary call routing using the ASF-RTL system is shown in the call flow diagram of FIG. 7, according to an embodiment of the invention. The calling party 2011, having the telephone number 925-834-1234, initiates a telephone call at step 2402 by dialing the destination telephone 2031, having the telephone number 415-921-5678. Originating SSP 2004 is triggered by the telephone call, and queries SCP 2024 at step 2404 for call processing instructions. The query includes the initiating telephone number 925-834-1234 as the calling party number and the dialed number 415-921-5678 as the called number. The query also includes the nature of the number called, which for purposes of the example is a 3 (i.e., call within the NANP).

The SCP 2024 proceeds to look-up the called number in the MDP table to determine the called party ID, which in this case is also 415-921-5678. If the dialed number was 7 digit number, the SCP 2024 would have determined the 10 digit value according to the MDP table. The SCP 2024 then looks up the called party ID in an ASF table to identify a corresponding ASF-RTL telephone number, if any, which in this example is 925-789-3412. The ASF-RTL telephone number is the telephone number of the ASF-RTL host SSP 2024. Because the called number is in the ASF-RTL table, the SCP 2024 changes the called party ID to the ASF-RTL telephone number, 925-789-3412, reclassifies the original called number as the original called number (ON), or the redirecting number (RDN), assigns an original called party ID equal to the ON, and returns the called party ID, the original called party ID and the calling party ID to SSP 2004 at step 2406.

Based on the instructions returned from the SCP 2024, the originating SSP 2004 determines whether the new called party ID (i.e., the ASF-RTL telephone number) is an intraLATA or an interLATA call. It generates the initial address message (IAM) for SS7 signaling and routes the call via the trunk identified in the IAM to the second switch, SSP 2014, which is the host switch for the ASF-RTL private trunk group, at step 2408. The SSP 2004 likewise forwards to the ASF-RTL host SSP 2014 the call routing instructions, including the called party ID, the original called party ID, the calling party ID, the called number NON and the original called number NON. The SSP 2014 responds with an address completion message to confirm receipt of call data at step 2410.

The ASF-RTL host SSP 2014 then queries the SCP 2024 at step 2412 for instructions, including in the query the call routing instructions received from the SSP 2004. In a collected address variable, the SCP 2024 is informed that the querying switch is the host switch for the ASF-RTL private trunk group. The SCP 2024 then executes the ASF-RTL service logic, previously described in FIGS. 6 and 7. For example, the SCP 2024 performs a security check, discussed with reference to FIG. 5 above, prior to instructing the switch to forward the call over the tie-line. The SCP 2024 then determines the trunk groups and carriers over which the call may be forwarded. The called party ID is changed back to the original called number, which is sent, along with the calling party ID, the trunk group ID and the called number NON back to the ASF-RTL host SSP 2014 at step 2414.

The ASF-RTL host SSP 2014 determines whether the primary trunk group is busy, or otherwise unavailable. If so, the SSP 2014 may route the call according to any alternate trunk group or carrier parameters provided by the SCP 2024. The SSP 2014 determines the route index and forwards the called party ID over the determined trunk group (and carrier, if the PSTN is used) to the ETN node 2016 at step 2416, via MF trunk signaling. The ETN node 2016 forwards the called party ID to the terminating switch, SSP 2018, at step 2418, also via MF trunk signaling. The SSP 2018 terminates the call to the called party telephone 2031 at step 2420. When the call is answered, an answering indication is returned to the ASF-RTL host SSP 2014 at step 2426, via the SSP 2018 at step 2422 and the ETN node at step 2424. The final "talk path" connection between the calling party 925-8734-1234 and the called party 415-921-5678 incorporates call routing through the originating SSP 2004, the ASF-RTL host SSP 2014, the ETN node 2016 and the terminating SSP 2018.

Figure 8:
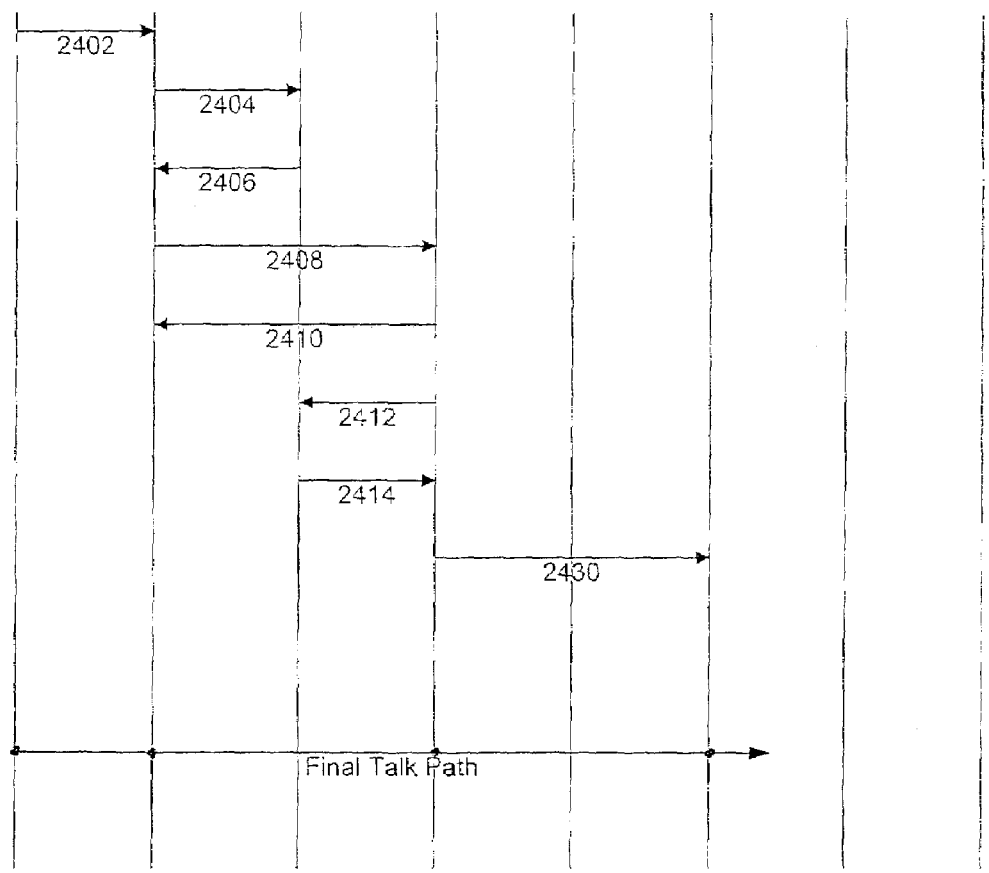
FIG. 8 is an exemplary call flow diagram showing routing of a telephone call through the ASF-RTL system to an international gateway, according to an aspect of the present invention.

FIG. 8 is a call flow diagram depicting an exemplary call routing of an international call using the ASF-RTL system. Steps 2402 through 2414 in FIG. 8 are identical to those steps of FIG. 7, except that the called number NON and the original called number NON are equal to 4, indicating an international call. Moreover, at steps 2406-2414, the called number NON is temporarily set to 3, indicating that the ASF-RTL telephone number is an NANP number. After the call is routed to the ASF-RTL host SSP 2014 at step 2414, the SSP 2014 routes the call to an international gateway 2026, as opposed to the ETN node 2016. The international gateway 2026 routes the call, based on the called party ID to the appropriate international destination.

Usage Billing Treatment

As briefly discussed above, usage billing treatment includes two functions: usage billing suppression and usage billing reduction. With these two options, the customer is able to choose the appropriate usage treatment based on their usage patterns and overall network traffic configurations.

Usage billing treatment from centrex and PBX stations can be applied on centrex to centrex calls, centrex to PBX calls, PBX to PBX calls, and PBX to centrex calls. The billing treatment provides the customer's account team with flexibility to use these treatment features in order to discount usage pricing depending on current and projected usage trends. The highest grade of discount is usage billing suppression, in which the billing record is discarded and the usage is charged as a usage billing suppression feature charge or flat rate price.

Usage billing reduction allows usage to be rated at a discount price and allows flexibility in charges based on amount of usage, network configurations, competitive response, and which fully participating classes of service originate the call and which receive the call. Usage billing reduction pricing is set by contract usage pricing but is supported by billing systems.

At all times these usage billing treatment classifications for centrex and PBX are only available on like classes of service if all originating and destination stations, trunks or DID numbers are provisioned with the same treatment classification. In the case of like classes of services or unlike classes of services having different treatment classification, the lowest grade of discount will apply, i.e., the highest usage price. In any case, all pricing paradigms must be supported by billing systems.

Usage billing suppression (UBS) is an option for the triggering centrex stations in a subscribing customer group. In order to be eligible for usage billing suppression, the originating and receiving station lines must be fully participating centrex stations and the call must be a voice only call and an intraLATA call.

Usage billing reduction (UBR) is an option for the triggering PBX stations/trunk groups (DID banks) in a subscribing customer group. Usage billing reduction is available between all provisioned stations whether they are PBX or centrex as long as they are provisioned with UBR or UBS, respectively, and the call is intraLATA. In order to be eligible for UBR the calling station has to be a fully participating station/trunk group (DID bank) within the LATA and identified as voice only. In the case of a call between a UBS provisioned station and a UBR provisioned trunk group/DID bank, the UBR rating will apply.

The following rules apply to usage billing suppression: With UBS, the customer can expect to receive a monthly flat rate charge for intraLATA calling between centrex stations in lieu of per call billing. This monthly flat rate charge is expected to reduce message and toll charges for these particular calls. Usage billing suppression is available between centrex stations provisioned with a custom dialing plan, such as MDP, SDP, or both, and which are within the same LATA. In one embodiment, voice only calls includes fax calls and non-Integrated Services Digital Network (ISDN) data transmission at speeds of up to 56 KB/second.

UBS is not "free" usage, but rather is considered flat rate predictable usage between intraLATA, non-co-located centrex stations based on call volume averages on these types of calls. Usage billing suppression is a subscription option for the whole customer group, i.e., if one centrex telephone number of a customer subscribes to UBS, all centrex telephone numbers for the customer will have UBS.

When usage billing suppression is active for a customer group and a triggering centrex telephone number calls an intraLATA centrex telephone number, whose originating calls will trigger, the usage AMA record (the basis for billing) is suppressed, i.e., discarded for measured, local calls and for intraLATA toll calls. When a triggering centrex telephone number calls an interLATA centrex telephone number, whose originating calls would trigger, the usage AMA record is created as normal for interLATA toll calls. When a triggering centrex telephone number calls a terminating only telephone number, intraLATA or interLATA, the usage AMA record is created as normal for all calls. A dialed telephone number must be in the dialing plan in order to receive UBS.

Usage billing reduction (UBR) is an option for the triggering PBX stations/trunk groups (DID banks) in a subscribing customer group. UBR is available between all provisioned stations whether they are centrex or PBX as long as they are provisioned with usage billing suppression on centrex and usage billing reduction on PBX and the call is intraLATA. In order to be eligible for usage billing reduction the calling station has to be a fully participating station/trunk group (DID bank) within the LATA and identified as voice only. In the case of a call between a UBS provisioned station and a UBR provisioned stations/trunk groups (DID banks), the UBR rating will apply. In all cases, all pricing paradigms must be supportable by billing systems. It should be understood that some set up time for billing systems is required each time a change in rating is requested.

Usage billing reduction allows customers to take advantage of discount usage between intraLATA, inter-centrex/PBX locations. The following rules apply to usage billing reduction: With UBR, the customer's account team can identify and negotiate usage prices based on known location dialing patterns. These calls are intraLATA calling between centrex/PBX fully participating stations/trunk groups (DID banks) in lieu of per call billing. Usage billing reduction is available between centrex stations and/or PBX/trunk groups (DID banks) when they are fully participating in a custom dialing plan, such as MDP, SDP, and within the same LATA. The calls must also be voice only. In one embodiment, voice calls include fax calls and non-ISDN data transfer by 56 KB/second (and slower) modems. UBR unlike UBS is not flat rate pricing based on call volume averages, but is a device to allow customers to identify location usage patterns and rate according to negotiated prices, taking into consideration a full range of network costs and traffic.

In one embodiment, the customer selects UBS on centrex and UBR on PBX. In this embodiment, the account team has the option to discount usage on PBX to centrex and centrex to PBX, but the lowest classification is charged for the usage, i.e., the highest available usage charge. The lowest classification is also charged for the usage when UBR prices are discounted lower for some types of calls, i.e., the highest available usage charge applies.

The present invention requires billing systems that are able to translate originating and destination calling locations/classes of service at those locations and are able to rate the usage differently.

When a triggering centrex or PBX telephone number, whose originating calls would trigger, calls an interLATA centrex or PBX telephone number, the usage billing record is created as normal for interLATA toll calls. When a triggering centrex or PBX telephone number calls a terminating only telephone number, intraLATA or interLATA, the usage billing record is also created as normal for all calls.

As discussed above, certain switches are not always configured to provide the features of the present invention, for example, the 1AESS switches. Thus, if the customer has centrex or PBX connection service out of one of these switches, a trunk side connection is used to connect to an equipped switch. The cost of this private line should be paid for by the customer. The addition of 9+ actually may require two trunk groups for this embodiment if the access code cannot be sent. In addition, local 9+ traffic is sent back to the non-provisioned switch, e.g., the 1AESS, over the PSTN if the non-provisioned switch is the host switch for the called local telephone number.

In order to implement usage billing suppression, a service switching point (SSP) produces AMA records under the same circumstances that it normally produces AMA records, i.e., without the abbreviated dialing plan service. When the UBS feature is activated, the service control point (SCP) produces AMA records with an AIN AMAslpID in them that the service provider can use to suppress the usage sensitive billing record. Basically, the AMAslpID is a flag that the service provider can use to discard the AMA record.

The UBS AMAslpID is sent by the SCP whenever the SCP determines that the call is over the PSTN and is intraLATA; and the call is between two triggering centrex telephone numbers. It is noted that the called number may not be a terminating only telephone number in the dialing plan. In order to send the AMAslpID, the call must be a voice call.

Usage billing suppression and usage billing reduction each have two options: ON meaning the AMAslpID will be applied when the call is eligible; and OFF meaning the option was not subscribed to by the customer.

From a call type perspective the following are possible scenarios:
1. Centrex to centrex
2. Centrex to PBX
3. Centrex to other
4. PBX to PBX
5. PBX to centrex
6. PBX to other The UBS results for the two options are as follows: If the UBS ON option was chosen, only centrex to centrex calls will receive UBS treatment. If the UBS OFF option was chosen, centrex to centrex calls will not receive UBS treatment.

UBS does have a feature interaction with UBR. If UBS ON is the UBS option and UBR ON is the UBR option: centrex to centrex calls will receive UBS treatment. Centrex to PBX calls; PBX to PBX calls; and PBX to centrex calls will receive UBR treatment. If UBS OFF is the UBS option and UBR ON is the UBR option: PBX to PBX calls will receive UBR treatment. Centrex to centrex calls, centrex to PBX calls, and PBX to centrex calls will receive normal billing.

According to one embodiment, usage billing suppression and usage billing reduction are charged on an overall basis. Thus, every triggering centrex telephone number must have data entries to support the operation of UBS. Consequently, charging on a per triggering centrex telephone number basis achieves the overall basis.

UBR requires a discount to be applied to the normal usage charges for measured local or toll calls. This discount may be different for each of the two options in this feature, but the discount applies to all telephone numbers covered by each option in effect. UBR's price for this reduced usage billing is incremental or vertical on the basic triggering telephone number price.

According to an aspect of the present invention, the SSP produces AMA records under the same circumstances that produces AMA records as if the abbreviated dialing plan service did not exist. The service with the optional UBR feature produces AMA records with an AIN AMAslpID in them that the service provider can use to discount the usage sensitive billing record. Basically, the AMAslpID is a flag that the service provider can use to discount the AMA record after rating it. The discount rate comes from the customer's record.

The UBR AMAslpID is to be sent by the SCP whenever the SCP determines: The call is PSTN intraLATA, and the call is between two PBX telephone numbers that are triggering PBX telephone numbers. The call must also be a voice call. It is noted that the called telephone number may not be a terminating only telephone number in the dialing plan. An AMAslpID is not sent from the SCP when usage billing treatment is not subscribed to.

The UBR results for the two options (UBR ON and UBR OFF) are as follows: If the UBR ON option was chosen, only PBX to PBX calls will get the UBR AMAslpID for PBX. If the UBR OFF option was chosen, PBX to PBX calls will not get the UBR AMAslpID for PBX. Centrex to centrex calls, centrex to other calls, and PBX to other calls are never eligible for UBR.

UBR has an additional feature interaction with UBS. If UBR OFF is the UBR option and UBS ON is the UBS option, centrex to PBX calls, PBX to PBX calls, and PBX to centrex calls will get normal billing. Centrex to centrex calls will receive UBS.

According to the present invention, it is important to identify the calling party ID with an indicator so that it is known whether the calling party is a PBX or centrex station. UBS and UBR are features that allow a specific customer to subscribe to them by general class of service, i.e., centrex or PBX. A specific customer may or may not subscribe to UBS for centrex and may or may not subscribe to UBR. The billing option taken for centrex has no impact on the billing option that may be selected for PBX and vice versa.

Even if a specific customer subscribes to UBS or UBR, there are several conditions that must be met before either may be applied to a call. Each condition requires that information relative to that condition be derived from call processing. The most fundamental question is what is the general class of service of the calling party: centrex or PBX? The second fundamental question is does the customer subscribe to billing for that class of service, i.e., is the UBS option ON or is the UBR option ON? From there, the other conditions, e.g., the billing for the called class of service, intraLATA, and voice are factors that must be derived from call processing.

Figure 9:
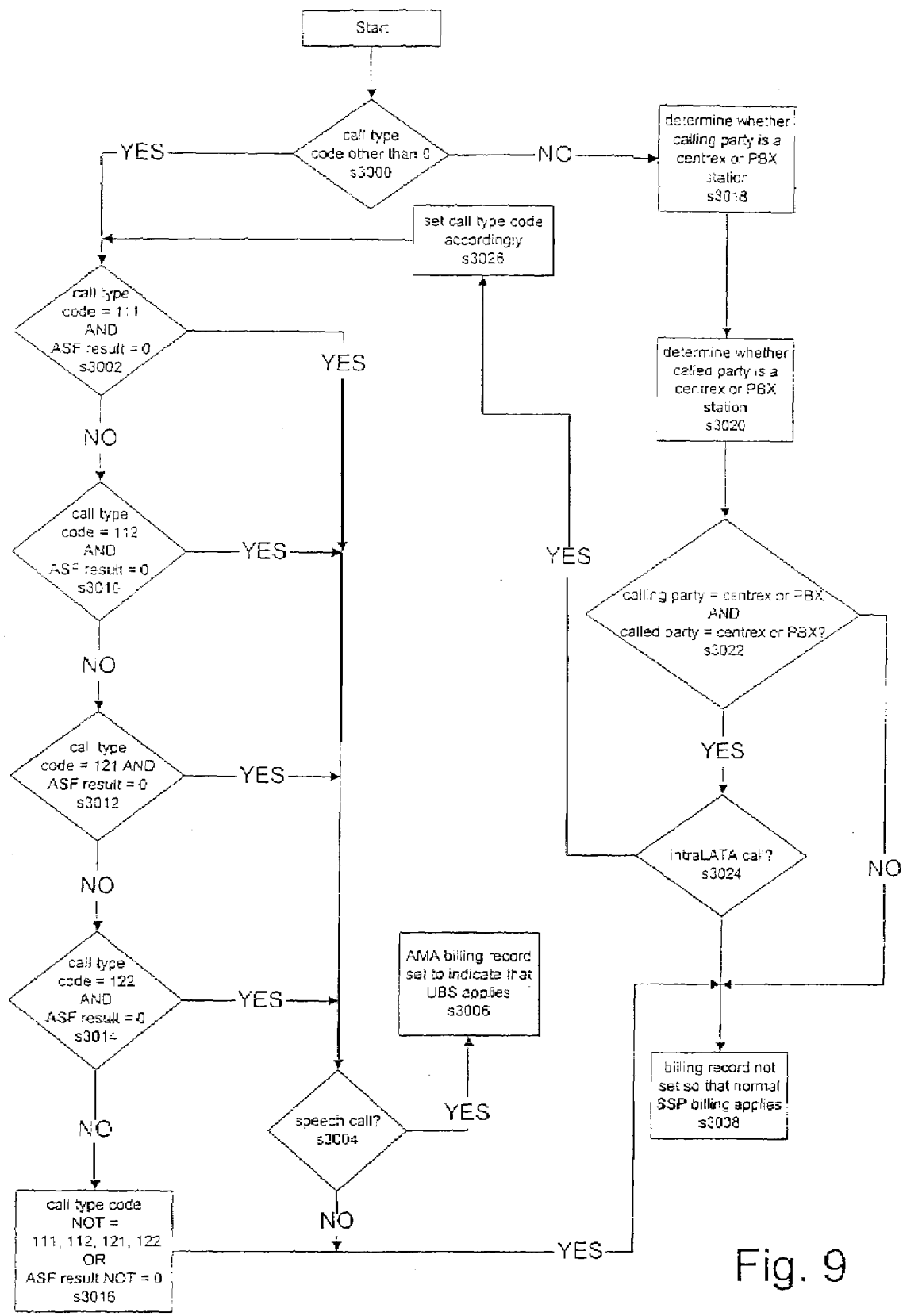
FIG. 9 is a flow chart showing an exemplary PSTN billing service logic, according to an aspect of the present invention.

Referring now to FIG. 9, using the value of the call type code, it is determined whether the value of the call type code is not 0 at step s3000. If the call type code value is not 0, primary billing logic will be used because a value for the call type code was previously determined, either as part of OCS or ASF-RTL. If the value of the call type code is 0 (default—never determined) (step s3000: NO), alternate billing logic will be used because a value of the call type code was not determined previously.

At step s3002, it is determined whether the value of the call type code indicates that the call is intraLATA, centrex to centrex (a value of 111 in one embodiment) and the value of the ASF result is 0 (i.e., ASF-RTL has not changed the routing). If both values are 111 and 0, respectively, the service logic will determine whether the call is a voice call at step s3004. If the call is determined to be a voice call, at step s3006 the AMA billing record is set so that UBS applies. If the call is determined not to be a voice call, at step s3008 the value of the AMA billing record is not set such that normal SSP billing will apply.

If the call type code is not 111 or the ASF result is 0, at step s3010 it is determined whether the call type code indicates that the call is intraLATA, centrex to PBX (a value of 112 in an embodiment) the value of the ASF result is 0 (i.e., ASF has not changed the routing). If both values are 112 and 0, respectively, the service logic will determine whether the call is a voice call at step s3004. If the call is determined to be a voice call, at step s3006 the AMA billing record is set so that UBS applies. If the call is determined not to be a voice call, at step s3008 the value of the AMA billing record is not set such that normal SSP billing will apply.

If the call type code is not 112 or the ASF result is not 0, at step s3012 it is determined whether the call type code indicates that the call is intraLATA, PBX to centrex (a value of 121 in a preferred embodiment) and the value of the ASF result is 0 (i.e., ASF has not changed the routing). If both values are 121 and 0, respectively, the common service logic CPR will determine whether the call is a voice call at step s3004. If the call is determined to be a voice call, at step s3006 the AMA billing record is set so that UBS applies. If the call is determined not to be a voice call, at step s3008 the value of the AMA billing record is not set such that normal SSP billing will apply.

If the call type code is not 121 or the ASF result is not 0, at step s3014 it is determined whether the call type code indicates that the call is intraLATA, PBX to PBX (a value of 122 in a preferred embodiment) and the value of the ASF result is 0 (i.e., ASF has not changed the routing). If both values are 122 and 0, respectively, the common service logic CPR will determine whether the call is a voice call at step s3004. If the call is determined to be a voice call, at step s3006 the AMA billing record is set so that UBS applies. If the call is determined not to be a voice call, at step s3008 the value of the AMA billing record is not set such that normal SSP billing will apply.

If the call type code is not 122 or the ASF result is not 0, at step s3016 it is known that the call type code is not 111, 112, 121 or 122, or the ASF result is not 0. Thus, the value of the AMA billing record is not set such that normal SSP billing will apply at step s3008.

Returning to step s3000, when it is determined that the call type code is 0 (in other words, the call type code has not yet been determined), the service logic determines whether the calling party is a centrex or PBX station at step s3018. Subsequently, at step s3020 it is determined whether the called party is a centrex or PBX station. If the calling party is a centrex or PBX station and the called party is a centrex or PBX station, as determined at step s3022, at step s3024 it is determined whether the call is intraLATA. If either the calling party is not a centrex or PBX station or the called party is not a centrex or PBX station, at step s3008 the value of the AMA billing record is not set such that normal SSP billing will apply.

If the call is determined to be intraLATA at step s3024, at step s3026 the call type code is set in accordance with the results obtained in steps s3018 and s3020. Then, the logic starting at s3002 repeats, as described above, with the newly set call type code. If the call is determined not to be an intraLATA call, at step s3008 the value of the AMA billing record is not set such that normal SSP billing will apply.

The billing department of the local exchange carrier processes UBS AMA records such that the customer does not receive local usage charges for the call. The monthly recurring charges for the UBS feature recover costs in lieu of local usage billing. The billing data can be captured for financial verification to ensure that costs are met. In an alternate embodiment, the UBS AMA records are sent to another local service provider if the subscriber's service is provided via resale or unbundled. Originating centrex calls that are intraLATA are also processed for originating access billing.

The billing department of the local exchange carrier processes the UBR AMA records such that customer receives the discounted PBX local usage charge for the call. In this case, the monthly recurring charge for the UBR-PBX feature and the discounted rate are how the cost is recovered in lieu of normal local usage billing. The billing data is captured to bill the discounted PBX local usage charge and for financial verification that costs are met. In an alternate embodiment, the UBR AMA records are sent to another local service provider if the subscriber's service is provided via resale or unbundled. Originating centrex calls that are intraLATA are also processed for originating access billing.

In one embodiment, an additional type of billing treatment is provided. This additional type of billing treatment can be subscribed to by the customer if the customer subscribes to ASF-RTL. This additional billing treatment will be referred to as remote tie line billing reduction (RBR) (step s210 of FIG. 2). In this embodiment, only usage billing reduction (rather than suppression) is available.

RBR is independent from UBR and UBS because it is possible to subscribe to RBR without subscribing to UBS or UBR. When a customer subscribes to RBR, RBR applies to all ASF-RTL telephone numbers. In other words, it is not possible for some ASF-RTL telephone numbers to be treated according to RBR while other ASF-RTL telephone numbers are not treated in accordance with RBR. In addition, with RBR the general class of service originating the call, i.e., centrex or PBX, is irrelevant. If the calling party places a voice call that is routed to an ASF-RTL telephone number in the same LATA as the calling party, and if RBR is active, the call will be billed in accordance with RBR. Otherwise, normal switch billing occurs.

RBR is applied on the PSTN leg of the call from the originating number to the ASF-RTL host switch, where the call is passed over to private facilities. RBR can be discounted to any level including zero rating based on an RBR flat rate price. In one embodiment, there is flexibility within the RBR rating so that charges can be differentiated based on class of service and location routing through the ASF-RTL host switch, but all pricing paradigms must be supportable by billing systems. The present invention only supplies the AMAslpID and class of service. Location identification comes from the normal billing process. RBR is available and applicable only when all ASF-RTL host switches are fully participating.

RBR is also a variant of UBS and is similar to UBR. RBR applies only to remote tie lines (RTLs) in the ASF-RTL feature. RBR says that a discount will be applied to the normal usage charges for measured local or toll if the calling party number and remote tie line telephone number are in the same LATA regardless of what the true called number is. Hence, the first leg, the PSTN leg, is discounted if the calling party number and remote tie line telephone number are in the same LATA. It is noted that there is no requirement for a remote tie line telephone number to be in the same LATA as the switches that originate traffic to the remote tie line telephone number.

RBR exists for all RTL telephone numbers or it exists for none. Unlike UBR, RBR may range from a 0% (not logical) to a 100% (effectively UBS for remote tie line telephone numbers) discount. The discount, if not the same for all remote tie line telephone numbers, may vary by locations, and if it does, the rating systems in the billing organization will be responsible for applying such location sensitive discounts. RBR's price for this reduced usage billing is incremental or vertical on the basic remote tie line telephone number price. An advantage of RBR is that the customer receives a more predictable monthly bill instead of a bill that potentially fluctuates more widely.

Again, the present invention does nothing with respect to AMA billing without the UBR, UBS, or RBR feature. The switch produces AMA records under the same circumstances that it would produce AMA records as if the present invention did not exist. The present invention with the optional RBR feature produces AMA records with an AIN AMAslpID in them that a finance department can use to discount the usage sensitive billing record. Basically, the AMAslpID is a flag that the finance department can use to discount the AMA record after rating it. The discount rate will come from the customer's record in the finance department. Unlike UBS and UBR, RBR does not have any options.

An RBR AMAslpID is to be sent by the SCP whenever the SCP determines:

The call is PSTN intraLATA; the call is between a triggering telephone number and a remote tie line telephone number; and the call is a voice call.

From a call type perspective the following are possible scenarios:
1. Centrex to remote tie line telephone number (intraLATA, voice)
2. Centrex to remote tie line telephone number (intraLATA, data)
3. Centrex to remote tie line telephone number (interLATA, voice or data)
4. PBX to remote tie line telephone number (intraLATA, voice)
5. PBX to remote tie line telephone number (intraLATA, data)
6. PBX to remote tie line telephone number (interLATA, voice or data)

The RBR results for the six scenarios are as follows: Scenarios #1 and #4 would get the RBR AMAslpID. Scenarios #2, #3, #5 and #6 are never eligible for RBR.

RBR does have a feature interaction with UBS or UBR. If RBR exists for a call, UBS and UBR can not exist for the same call. If UBS or UBR exists for a call, RBR can not exist for the same call.

From a practical viewpoint, RBR is charged on an overall basis. If RBR is employed, every triggering telephone number, centrex and PBX, is assumed to have RBR such that data entries to support the operation of RBR are not necessary. Charging on a per remote tie line telephone number basis or on a per triggering telephone number, centrex and PBX basis are ways to achieve the overall basis.

The billing department of the local exchange carrier processes the RBR AMA records such that the customer receives the discounted RBR local usage charge for the call. It is noted that the monthly recurring charge for the RBR feature and the discounted rate recover costs in lieu of normal local usage billing. The billing data is captured to bill the discounted RBR local usage charge and for financial verification that costs are met. In an alternate embodiment, the RBR AMA records are sent to another local service provider if the subscriber's service is provided via resale or unbundled. Originating centrex calls that are intraLATA are also processed for originating access billing.

Virtual SMDR

According to another embodiment of the present invention, a virtual station message detail recording (Virtual SMDR) system is provided. Virtual SMDR is an automated call data collection and report generating system that collects call data at a centralized service control point (SCP). The system formats the call data at a Virtual SMDR front end server as SMDR data and generates a call report based on the SMDR data at a host central processing unit.

The invention consolidates the data collection process for report generation at an SCP, as opposed to individual switches, and relies on sampling data routinely available to the SCP from the switches. Virtual SMDR therefore provides several advantages over the conventional SMDR systems. First, the customer does not need to purchase and load SMDR software packages at every service switching point that handles calls to and from the private telecommunications network. Likewise, the customer does not incur the expense of each switch's required connectivity with the host so that the SMDR data is available to the customer. Rather, only one connection is necessary: between the SCP and the host. Also, because the SCP does not require actual SMDR data generated by the switches, but only needs a sampling of SMDR-like data, Virtual SMDR has sufficient flexibility to generate calling records for PBX calls, as well as centrex calls, handled by the SCP.

Figure 10A:
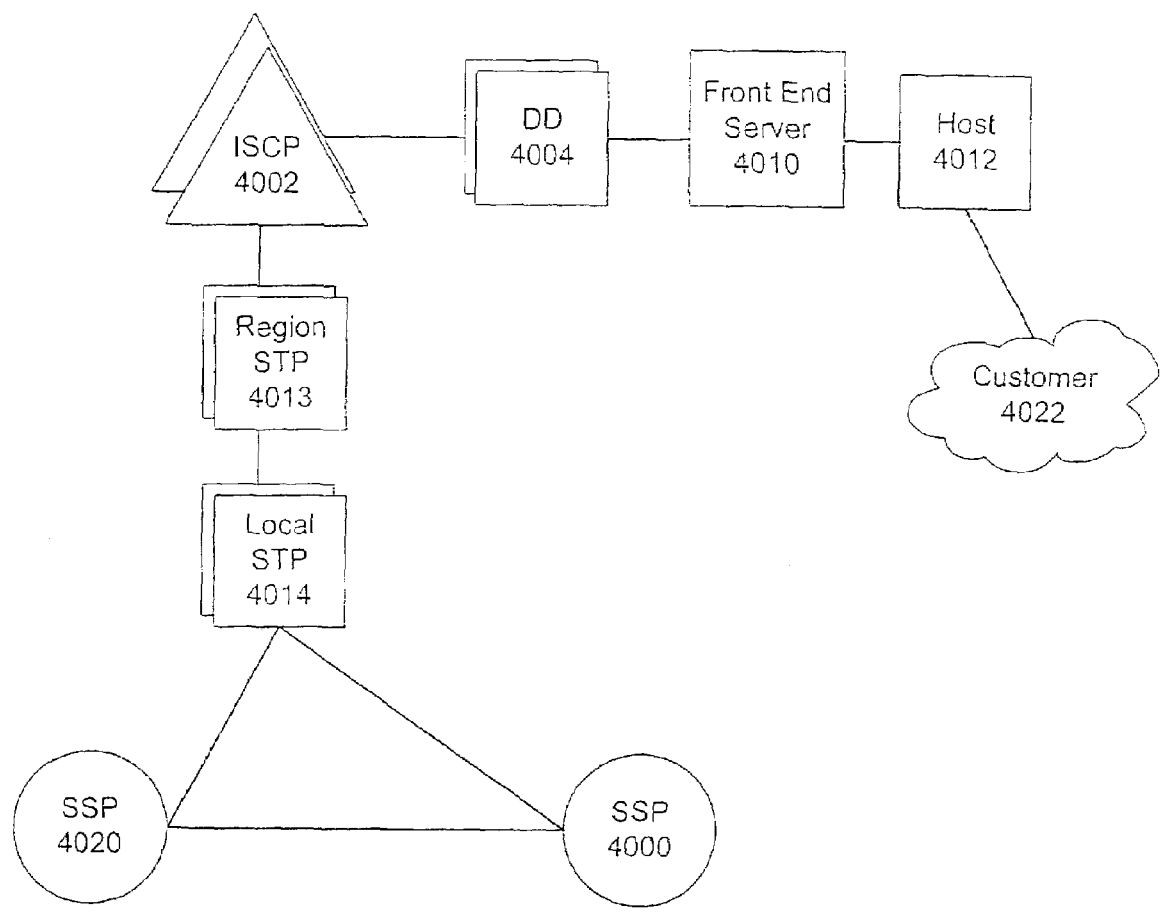
FIG. 10a is a block diagram showing an exemplary telecommunications network for implementing a Virtual SMDR system, according to an aspect of the present invention.

This present invention upgrades the current SMDR data collection and report generation system, simplifying the process, yet increasing functionality. FIG. 10a illustrates portions of an exemplary telecommunications network in association with one embodiment of the present invention for implementing the Virtual SMDR reporting system. The network includes service switching points (SSP) 4000 and 4020, and an Integrated Service Control Point (ISCP) 4002 in a public switched telecommunications network (PSTN). The PSTN also includes a local signal transfer point (STP) 4014 and a regional STP 4013 for directing signaling communications to the ISCP 4002.

The information generated by the PSTN is provided by way of a data distributor interface node 4004. The data is then transmitted to a Virtual SMDR front end server server 4010, such as a CentrexSMART front end (CFE) server. From the front end server 4010, the data is sent to a Virtual SMDR host central processing unit 4012, such as a CentrexSMART host. The data distributor 4004 serves as an interface between the PSTN and the network that formats and generates the Virtual SMDR reports. The data distributor 4004 has more than one interface type, including a billing interface and an American Standard Code for Information Interchange (ASCII) interface, for communicating with the ISCP 4002. The preferred interface for sampling is the data distributor ASCII interface, which is depicted in FIG. 10a. In an embodiment of the invention, the data distributor 4004 is implemented according to Bellcore SR 3918, ISCP Data Distributor/ASCII Collection System Interface Specification, available from Telecordia, Murray Hill, N.J., the contents of which are expressly incorporated by reference herein in its entirety.

Figure 10B:
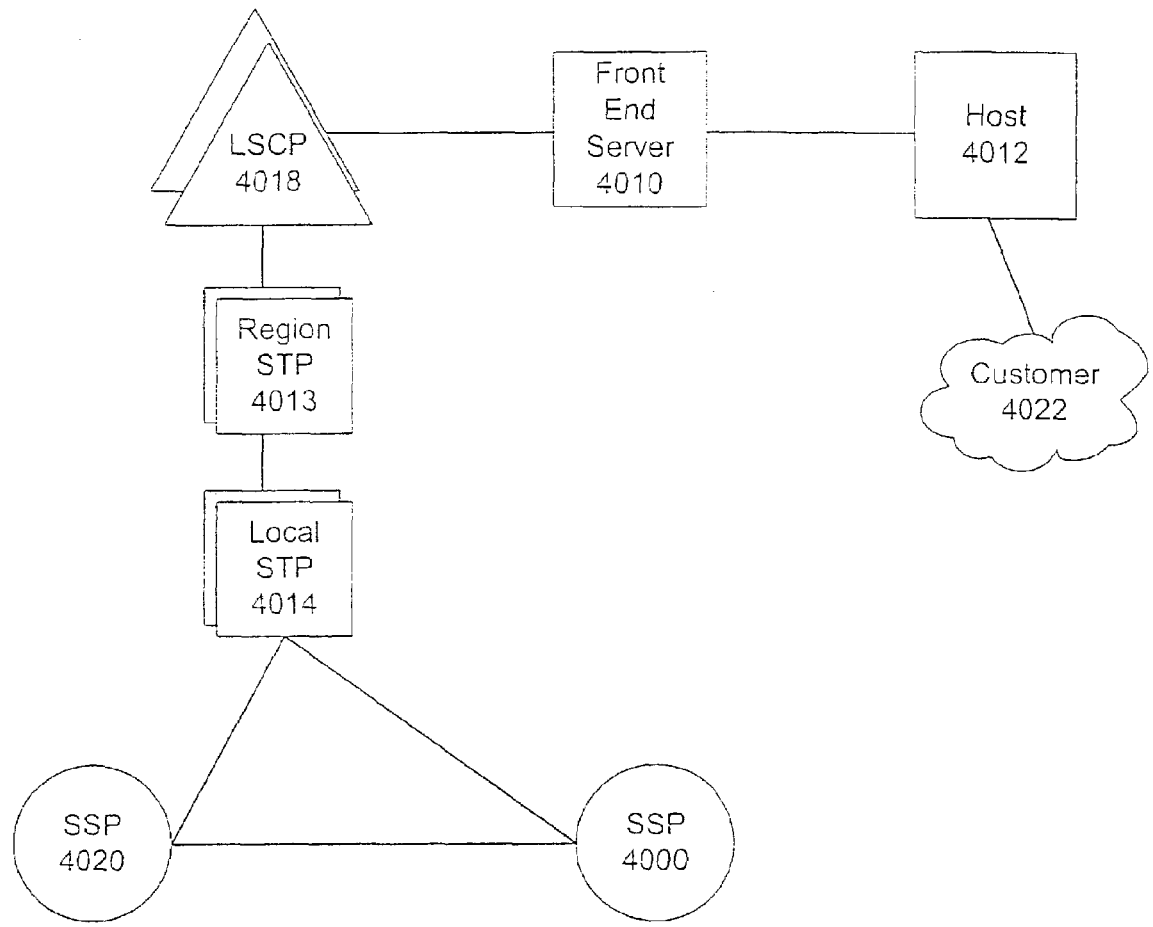
FIG. 10b is a block diagram showing an alternate exemplary telecommunications network for implementing a Virtual SMDR system, according to an aspect of the present invention.

In FIG. 10a, the SCP is an Integrated SCP, implemented with a Bellcore Integrated Service Control Point and loaded with ISCP software Version 4.4 (or higher), available from Telecordia, Murray Hill, N.J. Any compatible SCP may be incorporated in the invention. For example, FIG. 10b is a block diagram of the system incorporating a Lucent SCP (LSCP) 4018, with software release 94, or higher, available from Lucent Technologies, Inc., in place of ISCP 4002. As indicated by FIG. 10b, the incorporation of the LSCP 4018 eliminates the requirement for the data distributor 4004, as discussed further below. The remaining systems for implementing Virtual SMDR with the LSCP 4018, as shown in FIG. 10b, are identical to those systems used in conjunction with the ISCP 4002.

Figure 11:
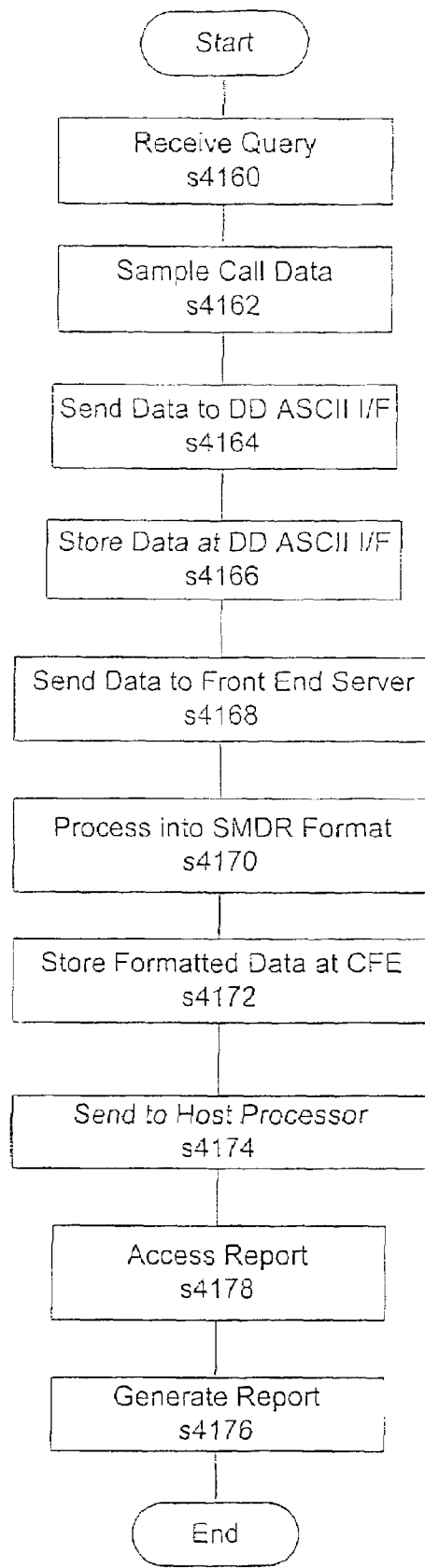
FIG. 11 is an exemplary flow chart of the Virtual SMDR service logic, according to an aspect of the present invention.

FIG. 11 is a flowchart showing exemplary steps for implementing Virtual SMDR according to the system depicted in FIG. 10a. At step s4160, the ISCP 4002 receives a query, via the STPs 4013 and 4014, from the originating SSP 4000. The call is processed in a known fashion, including sending call processing instructions to the originating SSP 4000 to direct the call, for example, to a terminating SSP 4020, and receiving and processing a query from the terminating SSP 4020.

For purposes of Virtual SMDR, receiving queries from the various switches is significant in that the queries provide the calling information from which the ISCP 4002 samples the SMDR-like data. In other words, the switches generate the basic data for call identification and handling as they would for any call employing the abbreviated dialing plan system of the present invention. The data is sampled at step s4162 by the SCP 4002. In particular, the ISCP 4002 selects data similar to the SMDR data that would be provided directly from the SSPs to an SMDR host in a conventional system. For instance, the ISCP 4002 samples the calling party ID, the called party ID, a customer group ID, the start time, and the end time.

Virtual SMDR is compatible with other features of the present invention. For example, for calls routed according to the automatic selection of facilities-remote tie line (ASF-RTL) feature, an additional variable indicating the original called party ID is included in the sampling. The ISCP 4002 and ultimately the Virtual SMDR host 4012 can then distinguish between the called party ID (i.e., the telephone number hosting a private trunk group for selected calls) and the telephone number of the desired destination of the caller.

After sampling the SMDR-like data from the originating SSP 4000 and the terminating SSP 4020, the ISCP 4002 outputs the data to the data distributor ASCII interface 4004 at step 4164. In the embodiment of the invention shown in FIG. 10a, the ISCP 4002 does not process or store the data for purposes of Virtual SMDR, but rather forwards the data without modifying the data. The data distributor 4004 stores and sorts the data at step s4166.

At step s4164, the data distributor 4004 produces two call records for any one telephone call made by a customer. The first record is an initial call or attempt data record created whenever the call is placed. The second record is a completion data record, which indicates the final status of the telephone call. The two records have a common identifier called, in an embodiment incorporating the ISCP 4002, "echo" data. The echo data enables the front end server 4010 to associate the attempt data record and the corresponding completion data record into a consolidated SMDR call record.

At step s4168 the data is sent from the data distributor 4004 to the front end server 4010 pursuant to known file transfer protocol (FTP) methods. In an embodiment of the invention, the data distributor 4004 transmits the call data at an interval of once per hour. At this point, the data is still not associated with SMDR processing and is simply a collection of telecommunications data as sampled by the ISCP 4002. The front end server 4010 processes the sampled data into an SMDR format at step s4170. The SMDR data is then essentially equivalent, from a formatting standpoint, to SMDR data provided directly from the switches in a conventional SMDR systems. The processing performed by the front end server 4010 includes associating the two sampled data records from the data distributor 4004, using the echo data identifier, so that the entire telephone call has a single SMDR record. The front end server 4010 then stores the formatted SMDR data at step s4172 and sends it to the Virtual SMDR host processor 4012 at step s4174.

The host processor 4012 stores the data in an SMDR format for access by the customer. The SMDR data is stored in a table format for each call, in one embodiment of the invention. The customer 4022 is able to request a variety of data combinations, from a full report to isolated call variables, depending on the customer's needs. The customer 4022 requests a Virtual SMDR report at step s4178 to be sent via a network interface using known connectivity techniques to an administrative facility (not pictured). The host processor 4012 generates the report at step s4176 according to the parameters requested by the customer, drawing from the data table associated with the telephone calls, and forwards the Virtual SMDR reports.

In a second embodiment, the SCP is an LSCP 4018, shown in FIG. 10b. The LSCP 4018 receives and stores call service data from the various originating and terminating switches, such as originating SSP 4000 and terminating SSP 4014, as in the first embodiment. However, there is no need for a separate interfacing system, such as the data distributor 4004 of FIG. 10a. Instead, the LSCP 4018 accomplishes all processing necessary for the front end server 4010 to associate records and to format the calling data into SMDR data. Therefore, according to the second embodiment of the invention, sampling the call data at step s4162, storing the call data at step s4164 (in this case in the LSCP 4018 rather than in the data distributor 4004) and sending the call data to the front end server at step s4168 are all performed by the LSCP 4018. Step s4164, sending data to the data distributor 4004, is thus eliminated. As in the first embodiment, two call records are generated, the initial call or attempt data and the completion data. These two call records are sent from the LSCP 4018 to the front end server 4010 at step s4168 along with the other sampled call data. The two records have a common identifier, called a "notification ID" data in this embodiment, that enables the front end server 4010 to associate the attempt data record and the corresponding completion data record to create and store an SMDR formatted table at steps s4170 and s4172 of FIG. 11. The report generated by the host processor 4012, which is accessible by the customer 4022, is the same regardless of the type of SCP used in the Virtual SMDR system.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and uses such as are within the scope of the appended claims.

In accordance with various embodiments of the present invention, the methods described herein are intended for operation as software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that the software implementations of the present invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards for Internet and other packet switched network transmission (e.g., TCP/IP, UDP/IP, HTML, SHTML, DHTML, XML, PPP, FTP, SMTP, MIME); peripheral control (IrDA; RS232C; USB; ISA; ExCA; PCMCIA), and public telephone networks (ISDN, ATM, XDSL) represent examples of the state of the art. Such standards are periodically superseded by faster or more efficient equivalents having essentially the same functions. Accordingly, replacement standards and protocols having the same functions are considered equivalents.

What is claimed is:

1. A method for routing a call to a called party number, comprising:
   routing the call, via at least one public trunk group, to a switch hosting an automatic selection of facilities-remote tie-line (ASF-RTL) number; and
   routing the call, via a private trunk group, from the switch hosting the ASF-RTL number to a switch hosting the called party number.

2. The method for routing the call according to claim 1, further comprising:
   routing the call from the switch hosting the ASF-RTL number to the switch hosting the called party number via an alternate public trunk group when the private trunk group is determined to be not available.

3. The method for routing the call according to claim 2, further comprising:
   determining a carrier associated with the alternate public trunk group; and
   routing the call from the switch hosting the ASF-RTL number to the switch hosting the called party number via the alternate public trunk group using the determined carrier.

4. The method for routing the call according to claim 2, in which the private trunk group is determined to be not available when the private trunk group is busy.

5. The method for routing the call according to claim 1, further comprising:
   routing the call from the switch hosting the called party number to an international gateway when the called party number comprises an international number.

6. The method for routing the call according to claim 5, in which routing the call to the international gateway comprises routing the call via a second private trunk group.

7. The method for routing the call according to claim 1, in which the ASF-RTL number is associated with a private network that includes the called party number.

8. The method for routing the call according to claim 7, in which the private network comprises at least one of a central exchange (Centrex) and a private branch exchange (PBX).

9. The method for routing the call according to claim 1, in which the switch hosting the called party number comprises one of an electronic tandem network node and an asynchronous transfer mode switch.

10. A method for routing a call to a called party number, though a private network and a public switched telephone network (PSTN), the method comprising:
    changing a called party identifier from a first number, corresponding to the called party number, to a second number, corresponding to a private trunk group associated with the private network;
    routing the call to a switch hosting the private trunk group based on the called party identifier;
    changing the called party identifier back to the first number; and routing the call from the host switch to the called party number, via at least the private trunk group, based on the called party identifier.

11. The method for routing the call according to claim 10, further comprising:
setting a redirecting number to the first number when the called party identifier is changed from the first number to the second number, wherein the called party identifier is changed back to the first number by referencing the redirecting number.

12. The method for routing the call according to claim 10, further comprising:
determining an alternative trunk group by which to route the call; and
routing the call from the host switch to the called party number, via at least the alternative trunk group, based on the called party identifier, when the private trunk group is not available.

13. The method for routing the call according to claim 12, further comprising:
determining a carrier associated with the alternative trunk group when the alternative trunk group comprises a public trunk group.

14. The method for routing the call according to claim 10, further comprising:
determining whether the call to is subject to routing via the private trunk group based on at least one of the called party number, a calling party number, a type of call, a date, a day of week, a time of day and a percentage allocation.

15. The method for routing the call according to claim 10, in which the second number comprises an automatic selection of facilities-remote tie-line (ASF-RTL) telephone number.

16. An apparatus for routing a call to a called party number through at least one private trunk group associated with an automatic selection of facilities-remote tie-line (ASF-RTL) number, the system comprising:
a service control point in a public switched telephone network (PSTN) that instructs an originating switch to route the call to a switch hosting the ASF-RTL number, and that instructs the host switch to route the call to a terminating switch associated with the called party number via the at least one private trunk group.

17. The apparatus for routing the call according to claim 16, in which the service control initially determines whether the call is subject to routing through the at least one private trunk group based on at least the called party number.

18. The apparatus for routing the call according to claim 17, in which the service control point further determines whether the called party number comprises an international number, and if so, instructs the terminating switch to route the call to an international gateway via a second private trunk group.

19. The apparatus for routing the call according to claim 17, in which the service control point further determines whether the called party number comprises a long distance number, and if so, instructs the terminating switch to route the call to an interexchange carrier switch via a second private trunk group.

20. The apparatus for routing the call according to claim 16, in which the called party number is associated with one a central exchange (Centrex) and a private branch exchange (PBX).

21. The apparatus for routing the call according to claim 16, in which the terminating switch comprises one of an electronic tandem network node and an asynchronous transfer mode switch.

22. The apparatus for routing the call according to claim 16, in which the at least one private trunk group comprises a multi-frequency trunk.

23. A system for routing calls through a public telecommunications network, comprising:
a plurality of trunk groups, comprising at least one private trunk group and at least one public trunk group, the at least one private trunk group having an associated number and host switch; and
a processor in the public telecommunications network that identifies each call entitled to use the at least one private trunk group, based on at least a called party number, and that changes a called party identifier of each entitled call from indicating the respective called party number to indicating the private trunk group number;
wherein each entitled call is routed to the host switch, via the at least one public trunk group, based on the called party identifier, the host switch routing the call through the at least one private trunk group to a terminating switch associated with the respective called party number.

* * * * *